(12) United States Patent
Abedini et al.

(10) Patent No.: US 11,757,579 B2
(45) Date of Patent: Sep. 12, 2023

(54) EFFICIENT ACKNOWLEDGMENT BY RELAY NODE

(71) Applicant: QUALCOMM Incorporated, San Diego, CA (US)

(72) Inventors: Navid Abedini, Basking Ridge, NJ (US); Muhammad Nazmul Islam, Littleton, MA (US); Ashwin Sampath, Skillman, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 17/302,804

(22) Filed: May 12, 2021

(65) Prior Publication Data

US 2022/0368474 A1 Nov. 17, 2022

(51) Int. Cl.
*H04L 1/18* (2023.01)
*H04L 1/1867* (2023.01)
(Continued)

(52) U.S. Cl.
CPC ............ *H04L 1/1896* (2013.01); *H04L 1/189* (2013.01); *H04W 72/0466* (2013.01); *H04W 72/23* (2023.01)

(58) Field of Classification Search
CPC ............. H04W 40/22; H04W 72/1247; H04W 28/065; H04W 88/04; H04W 84/047;
(Continued)

(56) References Cited

U.S. PATENT DOCUMENTS 8,351,846 B2 * 1/2013 Lee ..................... H04W 99/00
370/352
9,521,532 B2 * 12/2016 Kowalewski ........... H04W 4/18
(Continued)

FOREIGN PATENT DOCUMENTS

EP 1962451 A2 6/2008

OTHER PUBLICATIONS

International Search Report and Written Opinion—PCT/US2022/071753—ISA/EPO—dated Sep. 6, 2022.
(Continued)

*Primary Examiner* — Man U Phan
(74) *Attorney, Agent, or Firm* — Harrity & Harrity, LLP

(57) ABSTRACT

This disclosure provides systems, methods and apparatuses for efficient signaling of feedback regarding communications of a relaying operation. In some aspects, a relay node may defer feedback regarding reception of a first communication until relaying feedback regarding the payload of the first communication, thereby reducing overhead and signaling burden. In some aspects, a relay node may skip the transmission of feedback regarding the first communication altogether, either on the assumption that the link between the relay node and the first wireless node is reliable, or on the basis of the first wireless node being able to infer the reception of the first communication based on subsequent communications. In some aspects, a relay node may be enabled to skip forwarding of feedback from a second wireless node, such that the first wireless node can infer that the payload was received if no negative feedback associated with the payload is received.

26 Claims, 21 Drawing Sheets

(51) Int. Cl.
*H04W 72/044* (2023.01)
*H04W 72/23* (2023.01)

(58) Field of Classification Search
CPC ... H04B 7/15528; H04B 7/155; H04L 45/566; H04L 67/60; H04L 5/0048; H04L 69/324; H04L 5/0007; H04L 67/563; H04L 27/26
USPC .................................................. 370/329, 331
See application file for complete search history.

(56) References Cited

U.S. PATENT DOCUMENTS

| | | | | |
|---|---|---|---|---|
| 10,348,455 | B2* | 7/2019 | Hoymann | H04W 72/30 |
| 10,368,349 | B2* | 7/2019 | Aijaz | H04L 1/1887 |
| 10,512,024 | B2* | 12/2019 | Hessler | H04L 67/563 |
| 2005/0232183 | A1 | 10/2005 | Sartori et al. | |
| 2007/0070929 | A1* | 3/2007 | Kang | H04B 7/2606 |
| | | | | 370/310 |
| 2009/0175214 | A1 | 7/2009 | Sfar et al. | |
| 2010/0110972 | A1* | 5/2010 | Kang | H04B 7/155 |
| | | | | 370/329 |
| 2021/0014729 | A1* | 1/2021 | Raghavan | H04W 28/06 |
| 2022/0045742 | A1* | 2/2022 | Abedini | H04B 7/155 |
| 2022/0045745 | A1* | 2/2022 | Abedini | H04B 7/0617 |
| 2022/0045808 | A1* | 2/2022 | Abedini | H04B 17/24 |
| 2022/0104101 | A1* | 3/2022 | Elshafie | H04W 72/20 |
| 2022/0109598 | A1* | 4/2022 | Abedini | H04L 27/2607 |

OTHER PUBLICATIONS

Partial International Search Report—PCT/US2022/071753—ISA/EPO—dated Jul. 14, 2022.

* cited by examiner

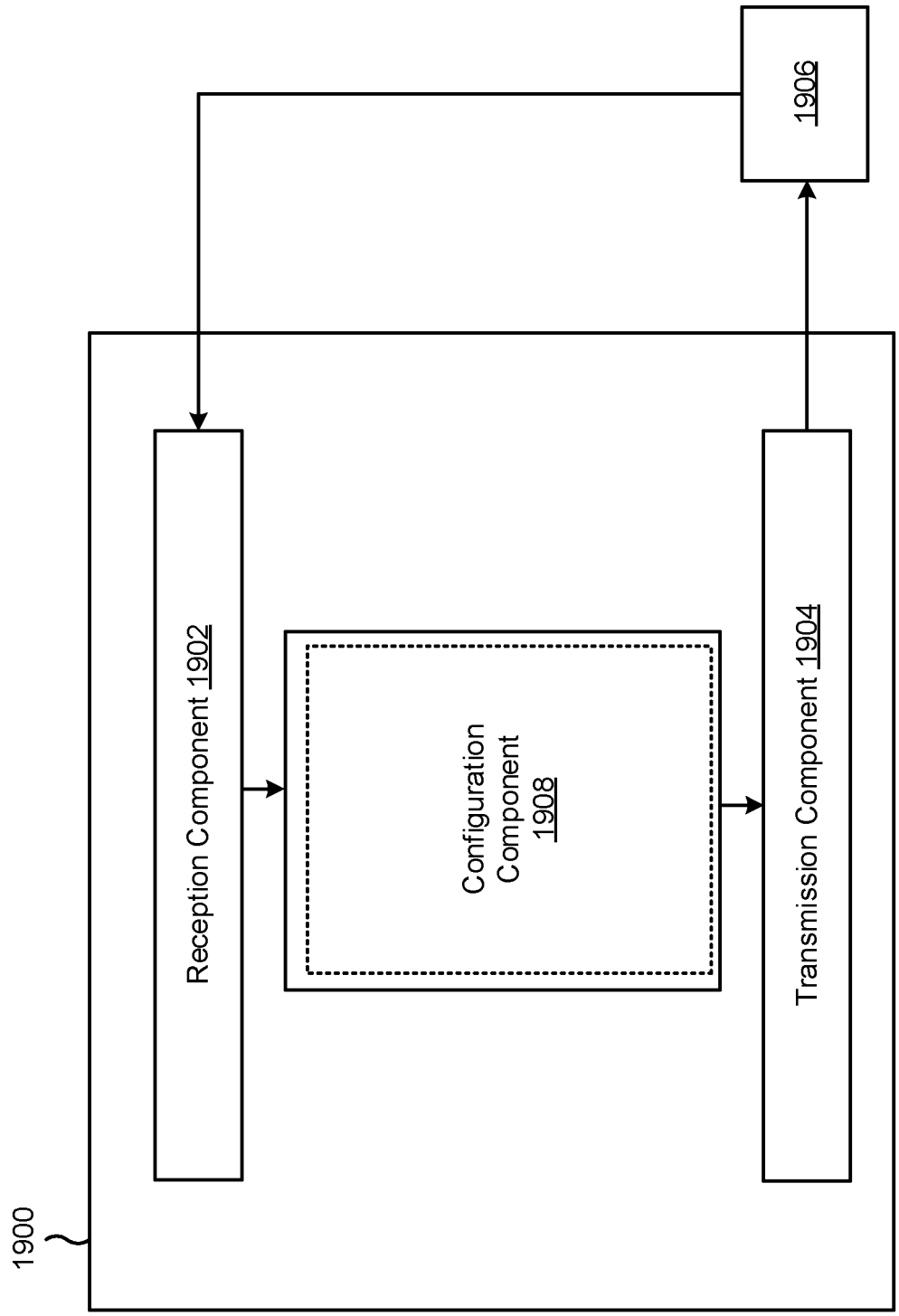

EFFICIENT ACKNOWLEDGMENT BY RELAY NODE

TECHNICAL FIELD

Aspects of the present disclosure relate generally to wireless communication and to techniques for efficient acknowledgment by a relay node.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a base station via the downlink (DL) and uplink (UL). The DL (or forward link) refers to the communication link from the base station to the UE, and the UL (or reverse link) refers to the communication link from the UE to the base station. As will be described in more detail herein, a base station may be referred to as a NodeB, an LTE evolved nodeB (eNB), a gNB, an access point (AP), a radio head, a transmit receive point (TRP), a New Radio (NR) base station, or a 5G NodeB.

These multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency-division multiplexing (OFDM) with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

In some aspects, a communication device of a relay node for wireless communication includes one or more interfaces configured to obtain, from a first wireless node and via a first wireless link, a first communication carrying a payload; a processing system configured to generate a second communication, where the second communication is different than the first communication, and where the second communication carries the payload of the first communication; the one or more interfaces configured to output, to a second wireless node and via a second wireless link, the second communication; the processing system configured to monitor for an indication of whether the second wireless node received the second communication; and the one or more interfaces configured to output, to the first wireless node, a third communication indicating whether the second wireless node received the second communication and indicating that the relay node received the first communication.

In some aspects, the first communication includes a shared channel, and the shared channel includes the payload and a control channel carrying control information for the second communication.

In some aspects, the one or more interfaces, to output the third communication, are configured to: forward the indication of whether the second wireless node received the second communication.

In some aspects, the third communication carries the indication of whether the second wireless node received the second communication and an explicit indication of whether the first wireless node successfully received the first communication.

In some aspects, the third communication is transmitted only if the second wireless node did not successfully receive the second communication.

In some aspects, a communication device of a first wireless node for wireless communication includes one or more interfaces configured to output, to a relay node and via a first wireless link, a first communication carrying a payload; and a processing system configured to monitor for an indication of whether the payload was received by a second wireless node and of whether the first communication was received by the relay node.

In some aspects, the one or more interfaces are configured to obtain the indication of whether the payload was received by the second wireless node, the indication includes a negative acknowledgment for the payload, and reception of the indication indicates whether the first communication was received by the relay node.

In some aspects, the processing system is further configured to: trigger retransmission of a second communication carrying the payload by the relay node.

In some aspects, reception of the indication indicates that the shared channel was received by the relay node.

In some aspects, the indication of whether the payload was received by the second wireless node and the explicit indication are multiplexed in an uplink channel.

In some aspects, the processing system is further configured to: trigger, based on the indication, a retransmission of a particular communication associated with a wireless node, of each wireless node on the path, that failed to receive the particular communication.

In some aspects, a communication device of a control node for wireless communication includes one or more interfaces configured to: output a first configuration to a first wireless node, where the first configuration is associated with a first communication carrying a payload; and output a second configuration to a relay node, where the second configuration is associated with at least one of transmitting a second communication carrying the payload of the first communication or processing feedback from a second wireless node.

In some aspects, the second configuration indicates to provide feedback regarding the first communication in association with an indication of whether the second wireless node received the second communication.

In some aspects, the feedback regarding the first communication is explicitly provided with the indication of whether the second wireless node received the second communication.

In some aspects, a method performed by a communication device of a relay node includes receiving, from a first wireless node and via a first wireless link, a first communication carrying a payload; generating a second communication, where the second communication is different than the first communication, and where the second communication carries the payload of the first communication; transmitting, to a second wireless node and via a second wireless link, the second communication; monitoring for an indication of whether the second wireless node received the second communication; and transmitting, to the first wireless node, a third communication indicating whether the second wireless node received the second communication and indicating that the relay node received the first communication.

In some aspects, the first communication includes a shared channel, and the shared channel includes the payload and a control channel carrying control information for the second communication.

In some aspects, transmitting the third communication further includes: forwarding the indication of whether the second wireless node received the second communication.

In some aspects, the third communication carries the indication of whether the second wireless node received the second communication and an explicit indication of whether the first wireless node successfully received the first communication.

In some aspects, the third communication is transmitted only if the second wireless node did not successfully receive the second communication.

In some aspects, a method performed by a communication device of a first wireless node includes transmitting, to a relay node and via a first wireless link, a first communication carrying a payload; and monitoring for an indication of whether the payload was received by a second wireless node and of whether the first communication was received by the relay node.

In some aspects, the method includes receiving the indication of whether the payload was received by the second wireless node, where the indication includes a negative acknowledgment for the payload, and where reception of the indication indicates whether the first communication was received by the relay node.

In some aspects, the method includes triggering retransmission of a second communication carrying the payload by the relay node.

In some aspects, reception of the indication indicates that the shared channel was received by the relay node.

In some aspects, the indication of whether the payload was received by the second wireless node and the explicit indication are multiplexed in an uplink channel.

In some aspects, the method includes triggering, based on the indication, a retransmission of a particular communication associated with a wireless node, of each wireless node on the path, that failed to receive the particular communication.

In some aspects, a method performed by a communication device of a control node includes transmitting a first configuration to a first wireless node, where the first configuration is associated with a first communication carrying a payload; and transmitting a second configuration to a relay node, where the second configuration is associated with at least one of transmitting a second communication carrying the payload of the first communication or processing feedback from a second wireless node.

In some aspects, the second configuration indicates to provide feedback regarding the first communication in association with an indication of whether the second wireless node received the second communication.

In some aspects, the feedback regarding the first communication is explicitly provided with the indication of whether the second wireless node received the second communication.

In some aspects, a non-transitory computer-readable medium storing a set of instructions for wireless communication includes one or more instructions that, when executed by one or more processors of a relay node, cause the relay node to: receive, from a first wireless node and via a first wireless link, a first communication carrying a payload; generate a second communication, where the second communication is different than the first communication, and where the second communication carries the payload of the first communication; transmit, to a second wireless node and via a second wireless link, the second communication; monitor for an indication of whether the second wireless node received the second communication; and transmit, to the first wireless node, a third communication indicating whether the second wireless node received the second communication and indicating that the relay node received the first communication.

In some aspects, the first communication includes a shared channel, and the shared channel includes the payload and a control channel carrying control information for the second communication.

In some aspects, the one or more instructions, that cause the relay node to transmit the third communication, cause the relay node to: forward the indication of whether the second wireless node received the second communication.

In some aspects, the third communication carries the indication of whether the second wireless node received the second communication and an explicit indication of whether the first wireless node successfully received the first communication.

In some aspects, the third communication is transmitted only if the second wireless node did not successfully receive the second communication.

In some aspects, a non-transitory computer-readable medium storing a set of instructions for wireless communication includes one or more instructions that, when executed by one or more processors of a first wireless node, cause the first wireless node to: transmit, to a relay node and via a first wireless link, a first communication carrying a payload; and monitor for an indication of whether the payload was received by a second wireless node and of whether the first communication was received by the relay node.

In some aspects, the one or more instructions further cause the first wireless node to: receive the indication of whether the payload was received by the second wireless node, where the indication includes a negative acknowledgment for the payload, and where reception of the indication indicates whether the first communication was received by the relay node.

In some aspects, the one or more instructions further cause the first wireless node to: trigger retransmission of a second communication carrying the payload by the relay node.

In some aspects, reception of the indication indicates that the shared channel was received by the relay node.

In some aspects, the indication of whether the payload was received by the second wireless node and the explicit indication are multiplexed in an uplink channel.

In some aspects, the one or more instructions further cause the first wireless node to: trigger, based on the indication, a retransmission of a particular communication associated with a wireless node, of each wireless node on the path, that failed to receive the particular communication.

In some aspects, a non-transitory computer-readable medium storing a set of instructions for wireless communication includes one or more instructions that, when executed by one or more processors of a control node, cause the control node to: transmit a first configuration to a first wireless node, where the first configuration is associated with a first communication carrying a payload; and transmit a second configuration to a relay node, where the second configuration is associated with at least one of transmitting a second communication carrying the payload of the first communication or processing feedback from a second wireless node.

In some aspects, the second configuration indicates to provide feedback regarding the first communication in association with an indication of whether the In some aspects, the feedback regarding the first communication is explicitly provided with the indication of whether the second wireless node received the second communication.

In some aspects, an apparatus for wireless communication includes means for receiving, from a first wireless node and via a first wireless link, a first communication carrying a payload; means for generating a second communication, where the second communication is different than the first communication, and where the second communication carries the payload of the first communication; means for transmitting, to a second wireless node and via a second wireless link, the second communication; means for monitoring for an indication of whether the second wireless node received the second communication; and means for transmitting, to the first wireless node, a third communication indicating whether the second wireless node received the second communication and indicating that the apparatus received the first communication.

In some aspects, the first communication includes a shared channel, and the shared channel includes the payload and a control channel carrying control information for the second communication.

In some aspects, the means for transmitting the third communication further includes: means for forwarding the indication of whether the second wireless node received the second communication.

In some aspects, the third communication carries the indication of whether the second wireless node received the second communication and an explicit indication of whether the first wireless node successfully received the first communication.

In some aspects, the third communication is transmitted only if the second wireless node did not successfully receive the second communication.

In some aspects, an apparatus for wireless communication includes means for transmitting, to a relay node and via a first wireless link, a first communication carrying a payload; and means for monitoring for an indication of whether the payload was received by a second wireless node and of whether the first communication was received by the relay node.

In some aspects, the apparatus includes means for receiving the indication of whether the payload was received by the second wireless node, where the indication includes a negative acknowledgment for the payload, and where reception of the indication indicates whether the first communication was received by the relay node.

In some aspects, the apparatus includes means for triggering retransmission of a second communication carrying the payload by the relay node.

In some aspects, reception of the indication indicates that the shared channel was received by the relay node.

In some aspects, the indication of whether the payload was received by the second wireless node and the explicit indication are multiplexed in an uplink channel.

In some aspects, the apparatus includes means for triggering, based on the indication, a retransmission of a particular communication associated with a wireless node, of each wireless node on the path, that failed to receive the particular communication.

In some aspects, an apparatus for wireless communication includes means for transmitting a first configuration to a first wireless node, where the first configuration is associated with a first communication carrying a payload; and means for transmitting a second configuration to a relay node, where the second configuration is associated with at least one of transmitting a second communication carrying the payload of the first communication or processing feedback from a second wireless node.

In some aspects, the second configuration indicates to provide feedback regarding the first communication in association with an indication of whether the second wireless node received the second communication.

In some aspects, the feedback regarding the first communication is explicitly provided with the indication of whether the second wireless node received the second communication.

Aspects generally include a method, apparatus, system, computer program product, non-transitory computer-readable medium, user equipment, base station, wireless communication device, or processing system as substantially described herein with reference to and as illustrated by the accompanying drawings.

Details of one or more implementations of the subject matter described in this disclosure are set forth in the accompanying drawings and the description. Other features, aspects, and advantages will become apparent from the description, the drawings and the claims. Note that the relative dimensions of the following figures may not be drawn to scale.

BRIEF DESCRIPTION OF THE DRAWINGS

FIGS. 17-19 are block diagrams of example apparatuses for wireless communication.

Like reference numbers and designations in the various drawings indicate like elements.

DETAILED DESCRIPTION

Figure 1:
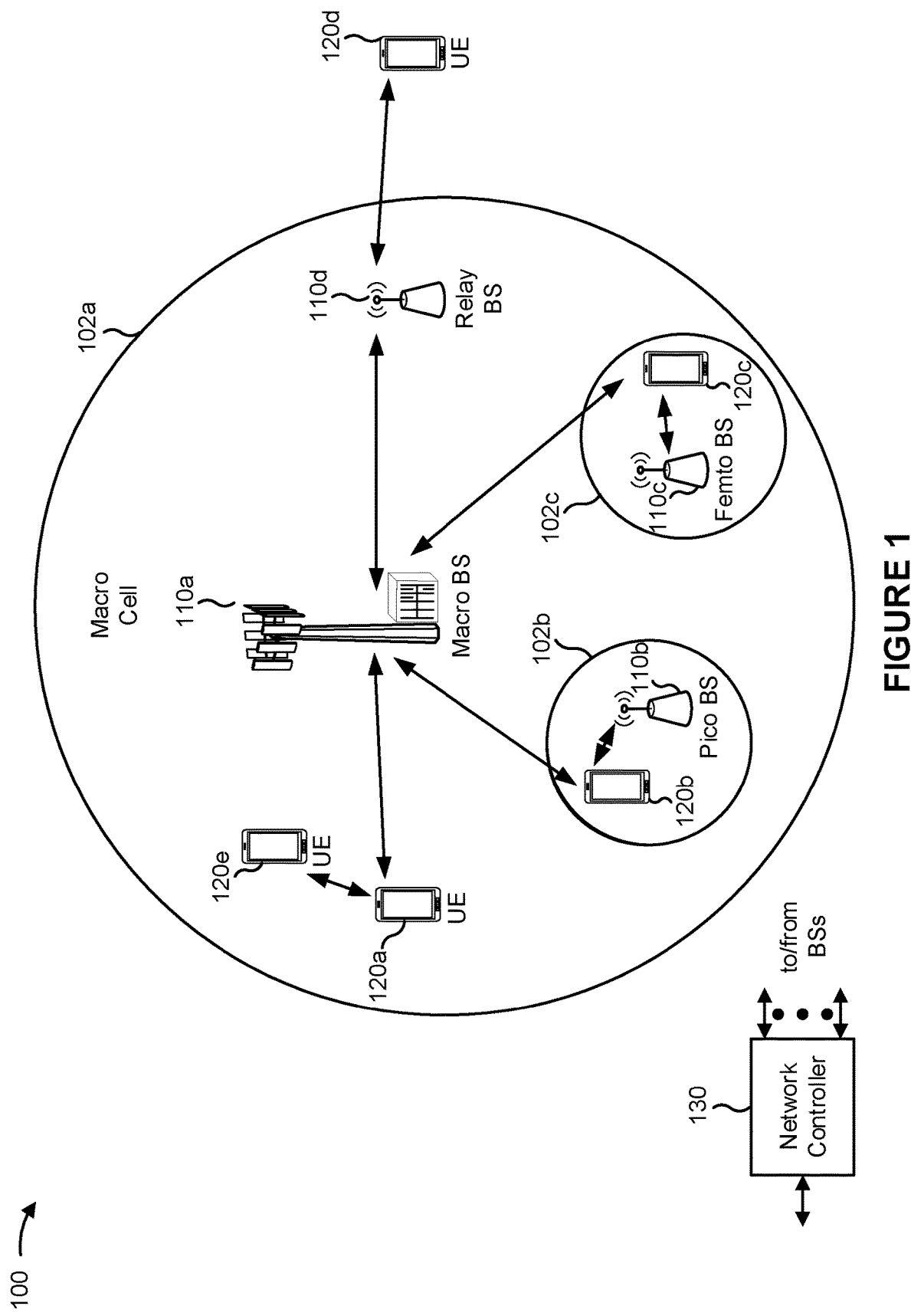
FIG. 1 is a diagram illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

A relay node is a device that receives a first communication and relays the first communication (such as in the form of a second communication). In some implementations, the relay node generates the second communication for the purpose of relaying a payload received in the first communication to a second wireless node (a target node of the payload). In some implementations, a relay node may generate the second communication based on information carried by the first communication. For example, the first communication may carry a set of in-phase/quadrature (I/Q) samples. The relay node may decode the first communication (which may include, for example, a physical downlink shared channel (PDSCH) or a physical uplink shared channel (PUSCH)), and may generate a second communication that carries the set of I/Q samples. Additionally, or alternatively, the first communication may carry information that identifies a destination of the payload, one or more parameters for relaying the payload, or similar information, which the relay node may use to generate and transmit the second communication. For example, the relay node may store or buffer the first communication or content of the first communication, and may use this stored or buffered information to generate and transmit the second communication. In some implementations, the relay node may first transmit control information that schedules a second communication, then may transmit the second communication via a shared channel on resources scheduled by the control information.

Upon successful reception and decoding of a first communication, the relay node may transmit an acknowledgment to a first wireless node (such as a distributed unit (DU)) from which the first communication was received and may continue with its scheduled operation. If the first communication is not successfully received or decoded, the relay node may transmit a negative acknowledgment (NACK) to the first wireless node. This way, the first wireless node can determine whether the relay node successfully received the first communication and can retransmit the first communication if the relay node did not receive the first communication. Furthermore, the target node may generate feedback regarding the payload (such as an acknowledgment (ACK)/negative ACK (NACK)) and may transmit the feedback to the first wireless node, such as via each relay node from which the payload traveled. However, the signaling of separate feedback from each relay node, as well as feedback from the second wireless node, may use significant network resources, thereby diminishing throughput. The network resource usage may be exacerbated in multi-hop deployments. For example, if there are three relay nodes between the first wireless node and the second wireless node, each of the three relay nodes may transmit respective feedback up the relay path. Such signaling may congest the relay path and diminish throughput.

Some techniques described herein enable efficient signaling of feedback regarding communications of a relaying operation. For example, a relay node may defer feedback regarding reception of a first communication until relaying an ACK/NACK regarding the payload of the first communication, thereby reducing overhead and signaling burden. As another example, a relay node may skip the transmission of feedback regarding the first communication altogether, either on the assumption that the link between the relay node and the first wireless node is reliable, or on the basis of the first wireless node being able to infer the reception of the first communication based on subsequent communications. Furthermore, some techniques described herein enable a relay unit to skip forwarding of an ACK from a second wireless node, such that the first wireless node can infer that the payload was received if no NACK associated with the payload is received.

Particular implementations of the subject matter described in this disclosure can be implemented to realize one or more of the following potential advantages. Overhead associated with acknowledgments in relaying operations may be reduced. Furthermore, by reducing overhead associated with acknowledgments in relay operations, the number of relay nodes that can be included in a relaying operation is increased. As such, and by employing the techniques disclosed herein, throughput may be increased. The techniques described also may be useful because fronthaul links may typically be reliable, such that acknowledgments on fronthaul links can be canceled or deferred without significant information loss. Furthermore, the techniques described may be useful because some relay units are able to process and decode feedback from downstream wireless node, which obviates some of the need to relay such feedback to a distributed unit. Even further, latency may be reduced by way of reducing overhead. Further, by reducing overhead and the number of transmitted communications, power usage may be reduced.

FIG. 1 is a diagram illustrating an example of a wireless network 100. The wireless network 100 may be or may include elements of a 5G New Radio (NR) network, an LTE network, or another type of network. The wireless network 100 may include one or more base stations 110 (shown as BS 110a, BS 110b, BS 110c, and BS 110d) and other network entities. A base station (BS) is an entity that communicates with user equipment (UEs) and also may be referred to as an NR base station, a Node B, a gNB, a 5G node B (NB), an access point, or a transmit receive point (TRP). Each base station may provide communication coverage for a particular geographic area. In 3GPP, the term "cell" can refer to a coverage area of a base station, a base station subsystem serving this coverage area, or a combination thereof, depending on the context in which the term is used.

A base station may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A base station for a macro cell may be referred to as a macro base station. A base station for a pico cell may be referred to as a pico base station. A base station for a femto cell may be referred to as a femto base station or a home base station. In the example shown in FIG. 1, a base station 110a may be a macro base station for a macro cell 102a, a base station 110b may be a pico base station for a pico cell 102b, and a base station 110c may be a femto base station for a femto cell 102c. A base station may support one or multiple (for example, three) cells. The terms "eNB", "base station", "NR base station", "gNB", "TRP", "AP", "node B", "5G NB", and "cell" may be used interchangeably herein.

In some examples, a cell may not necessarily be stationary, and the geographic area of the cell may move according to the location of a mobile base station. In some examples, the base stations may be interconnected to one another as well as to one or more other base stations or network nodes (not shown) in the wireless network 100 through various types of backhaul interfaces, such as a direct physical connection, a virtual network, or a combination thereof, using any suitable transport network.

The wireless network 100 may include relay stations. A relay station is an entity that can receive a transmission of data from an upstream station (for example, a base station or a UE) and send a transmission of the data to a downstream station (for example, a UE or a base station). A relay station also may be a UE that can relay transmissions for other UEs. In the example shown in FIG. 1, a relay base station 110d may communicate with a macro base station 110a and a UE 120d in order to facilitate communication between the macro base station 110a and the UE 120d. A relay base station also may be referred to as a relay station, a relay base station, a relay, etc.

The wireless network 100 may be a heterogeneous network that includes base stations of different types, such as macro base stations, pico base stations, femto base stations, or relay base stations, among other examples. These different types of base stations may have different transmit power levels, different coverage areas, and different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

Multiple UEs 120 (for example, a UE 120a, a UE 120b, a UE 120c, etc.) may be dispersed throughout the wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, or location tags, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). A UE 120 may be included inside a housing that houses components of the UE 120, such as processor components, memory components, or other components. In some examples, the processor components and the memory components may be coupled together. For example, the processor components (for example, one or more processors) and the memory components (for example, a memory) may be operatively coupled, communicatively coupled, electronically coupled, or electrically coupled, among other examples.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some aspects, two or more UEs 120 (for example, shown as a UE 120a and a UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or a similar protocol), or a mesh network. In such examples, the UE 120 may perform scheduling operations, resource selection operations, as well as other operations described elsewhere herein as being performed by the base station 110.

Devices of the wireless network 100 may communicate using the electromagnetic spectrum, which may be subdivided based on frequency or wavelength into various classes, bands, or channels. For example, devices of the wireless network 100 may communicate using an operating band having a first frequency range (FR1), which may span from 410 MHz to 7.125 GHz. As another example, devices of the wireless network 100 may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" may broadly represent frequencies less than 6 GHz, frequencies within FR1, mid-band frequencies (for example, greater than 7.125 GHz), or a combination thereof. Similarly, unless specifically stated otherwise, it should be understood that the term "millimeter wave" may broadly represent frequencies within the EHF band, frequencies within FR2, mid-band frequencies (for example, less than 24.25 GHz), or a combination thereof. It is contemplated that the frequencies included in FR1 and FR2 may be modified, and techniques described herein are applicable to those modified frequency ranges.

Figure 2:
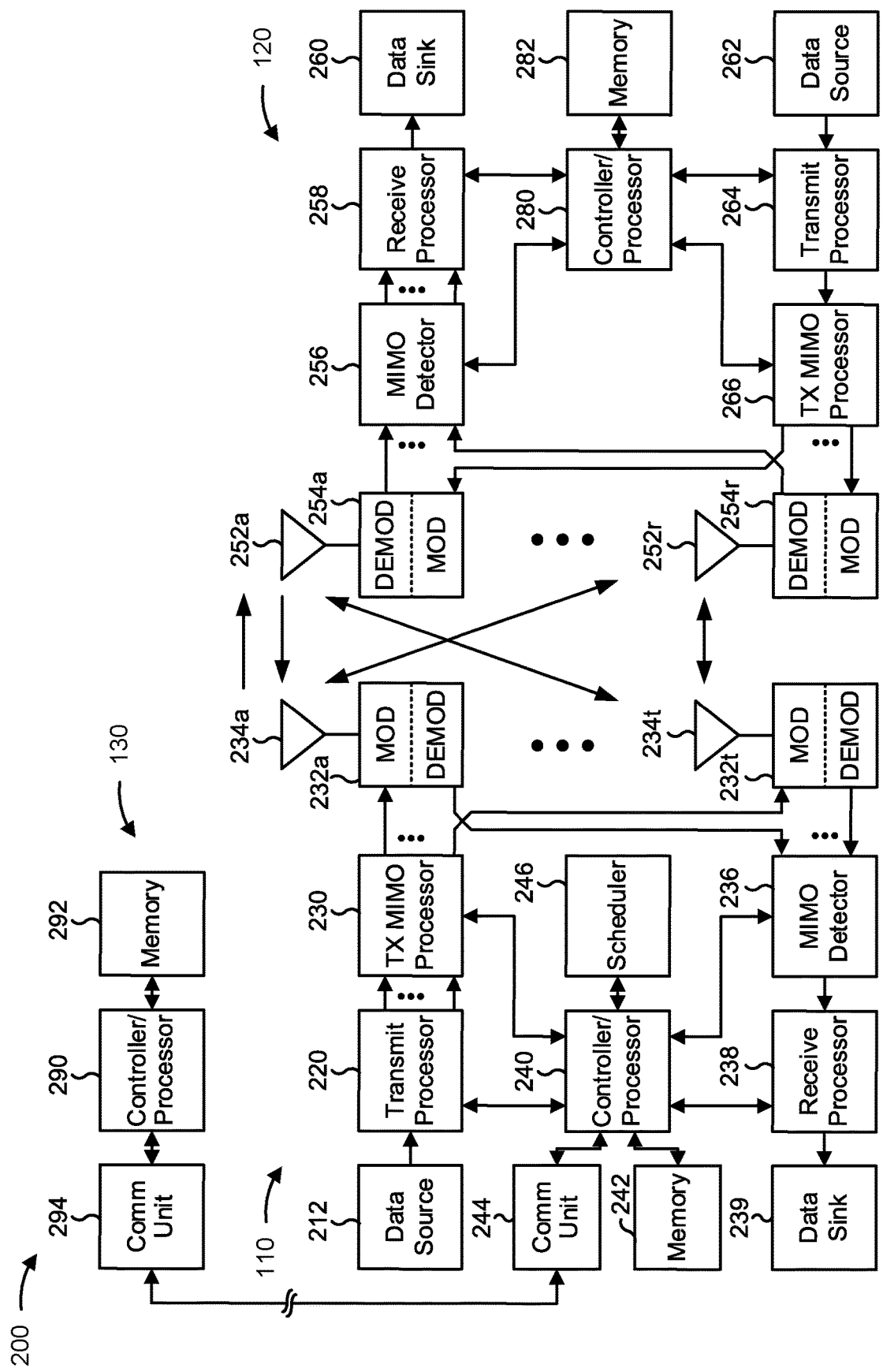
FIG. 2 is a diagram illustrating an example of a base station in communication with a user equipment (UE) in a wireless network.

FIG. 2 is a diagram illustrating an example 200 of a base station 110 in communication with a UE 120 in a wireless network 100. The base station 110 may be equipped with T antennas 234a through 234t, and the UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based on channel quality indicators (CQIs) received from the UE, process (for example, encode and modulate) the data for each UE based on the MCS(s) selected for the UE, and provide data symbols for all UEs. The transmit processor 220 also may process system information (for example, for semi-static resource partitioning information) and control information (for example, CQI requests, grants, or upper layer signaling) and provide overhead symbols and control symbols. The transmit processor 220 also may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM) to obtain an output sample stream. Each modulator 232 may further process (for example, convert to analog, amplify, filter, and upconvert) the output sample stream to obtain a downlink signal. T downlink signals from the modulators 232a through 232t may be transmitted via T antennas 234a through 234t, respectively.

At the UE 120, the antennas 252a through 252r may receive the downlink signals from the base station 110 or other base stations and may provide received signals to the demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some aspects, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

Antennas (such as antennas 234a through 234t and antennas 252a through 252r) may include, or may be included within, one or more antenna panels, antenna groups, sets of antenna elements, or antenna arrays, among other examples. An antenna panel, an antenna group, a set of antenna elements, or an antenna array may include one or more antenna elements. An antenna panel, an antenna group, a set of antenna elements, or an antenna array may include a set of coplanar antenna elements or a set of non-coplanar antenna elements. An antenna panel, an antenna group, a set of antenna elements, or an antenna array may include antenna elements within a single housing or antenna elements within multiple housings. An antenna panel, an antenna group, a set of antenna elements, or an antenna array may include one or more antenna elements coupled to one or more transmission or reception components, such as one or more components of FIG. 2.

On the uplink, at the UE 120, a transmit processor 264 may receive and process data from a data source 262 and control information (for example, for reports including RSRP, RSSI, RSRQ, or CQI) from a controller/processor 280. The transmit processor 264 also may generate reference symbols for one or more reference signals. The symbols from the transmit processor 264 may be precoded by a TX MIMO processor 266 if applicable, further processed by the modulators 254a through 254r (for example, for DFT-s-OFDM or CP-OFDM) and transmitted to the base station 110. In some aspects, a modulator and a demodulator (for example, MOD/DEMOD 254) of the UE 120 may be included in a modem of the UE 120. In some aspects, the UE 120 includes a transceiver. The transceiver may include any combination of the antenna(s) 252, the modulators 254, the demodulators 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein.

At the base station 110, the uplink signals from the UE 120 and other UEs may be received by the antennas 234, processed by the demodulators 232, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include a communication unit 244 and may communicate with the network controller 130 via the communication unit 244. The base station 110 may include a scheduler 246 to schedule one or more UEs 120 for downlink communications, uplink communications, or a combination thereof. In some aspects, a modulator and a demodulator (for example, MOD/DEMOD 232) of the base station 110 may be included in a modem of the base station 110. In some aspects, the base station 110 includes a transceiver. The transceiver may include any combination of the antenna(s) 234, the modulators 232, the demodulators 232, the MIMO detector 236, the receive processor 238, the transmit processor 220, or the TX MIMO processor 230. The transceiver may be used by a processor (for example, the controller/processor 240) and a memory 242 to perform aspects of any of the processes described herein.

In some implementations, the controller/processor 280 may be a component of a processing system. A processing system may generally refer to a system or series of machines or components that receives inputs and processes the inputs to produce a set of outputs (which may be passed to other systems or components of, for example, the UE 120). For example, a processing system of the UE 120 may refer to a system including the various other components or subcomponents of the UE 120.

The processing system of the UE 120 may interface with other components of the UE 120, and may process information received from other components (such as inputs or signals), output information to other components, etc. For example, a chip or modem of the UE 120 may include a processing system and one or more interfaces, such as a first interface to receive or obtain information, and a second interface to output, transmit or provide information. In some cases, the first interface may refer to an interface between the processing system of the chip or modem and a receiver, such that the UE 120 may receive information or signal inputs, and the information may be passed to the processing system. In some cases, the second interface may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, the controller/processor 240 may be a component of a processing system. A processing system may generally refer to a system or series of machines or components that receives inputs and processes the inputs to produce a set of outputs (which may be passed to other systems or components of, for example, the base station 110). For example, a processing system of the base station 110 may refer to a system including the various other components or subcomponents of the base station 110.

The processing system of the base station 110 may interface with other components of the base station 110, and may process information received from other components (such as inputs or signals), output information to other components, etc. For example, a chip or modem of the base station 110 may include a processing system and one or more interfaces, such as a first interface to receive or obtain information, and a second interface to output, transmit or provide information. In some cases, the first interface may refer to an interface between the processing system of the chip or modem and a receiver, such that the base station 110 may receive information or signal inputs, and the information may be passed to the processing system. In some cases, the second interface may refer to an interface between the processing system of the chip or modem and a transmitter, such that the base station 110 may transmit information output from the chip or modem. A person having ordinary skill in the art will readily recognize that the second interface also may obtain or receive information or signal inputs, and the first interface also may output, transmit or provide information.

The controller/processor 240 of the base station 110, the controller/processor 280 of the UE 120, or any other component(s) of FIG. 2 may perform one or more techniques associated with efficient acknowledgment by a relay node, as described in more detail elsewhere herein. For example, the controller/processor 240 of the base station 110, the controller/processor 280 of the UE 120, or any other component(s) (or combinations of components) of FIG. 2 may perform or direct operations of, for example, process 1400 of FIG. 14, process 1500 of FIG. 15, process 1600 of FIG. 16, or other processes as described herein. The memory 242 and the memory 282 may store data and program codes for the base station 110 and the UE 120, respectively. In some aspects, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 1400 of FIG. 14, process 1500 of FIG. 15, process 1600 of FIG. 16, or other processes as described herein.

In some aspects, a relay node (such as the BS 110 or the UE 120) includes means for receiving, from a first wireless node and via a first wireless link, a first communication carrying a payload; means for generating a second communication, where the second communication is different than the first communication, and where the second communication carries the payload of the first communication; means for transmitting, to a second wireless node and via a second wireless link, the second communication; means for monitoring for an indication of whether the second wireless node received the second communication; and means for transmitting, to the first wireless node, a third communication indicating whether the second wireless node received the second communication and indicating that the relay node received the first communication. In some aspects, the means for the relay node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a first wireless node (such as the BS 110) includes means for transmitting, to a relay node and via a first wireless link, a first communication carrying a payload; and means for monitoring for an indication of whether the payload was received by a second wireless node and of whether the first communication was received by the relay node. In some aspects, the means for the first wireless node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, a control node (such as the BS 110) includes means for transmitting a first configuration to a first wireless node, where the first configuration is associated with a first communication carrying a payload; and means for transmitting a second configuration to a relay node, where the second configuration is associated with at least one of transmitting a second communication carrying the payload of the first communication or processing feedback from a second wireless node. In some aspects, the means for the control node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described with respect to the blocks may be implemented in a single hardware, software, or combination component or in various combinations of components. For example, the functions described with respect to the transmit processor 264, the receive processor 258, the TX MIMO processor 266, or another processor may be performed by or under the control of the controller/processor 280.

Figure 3:
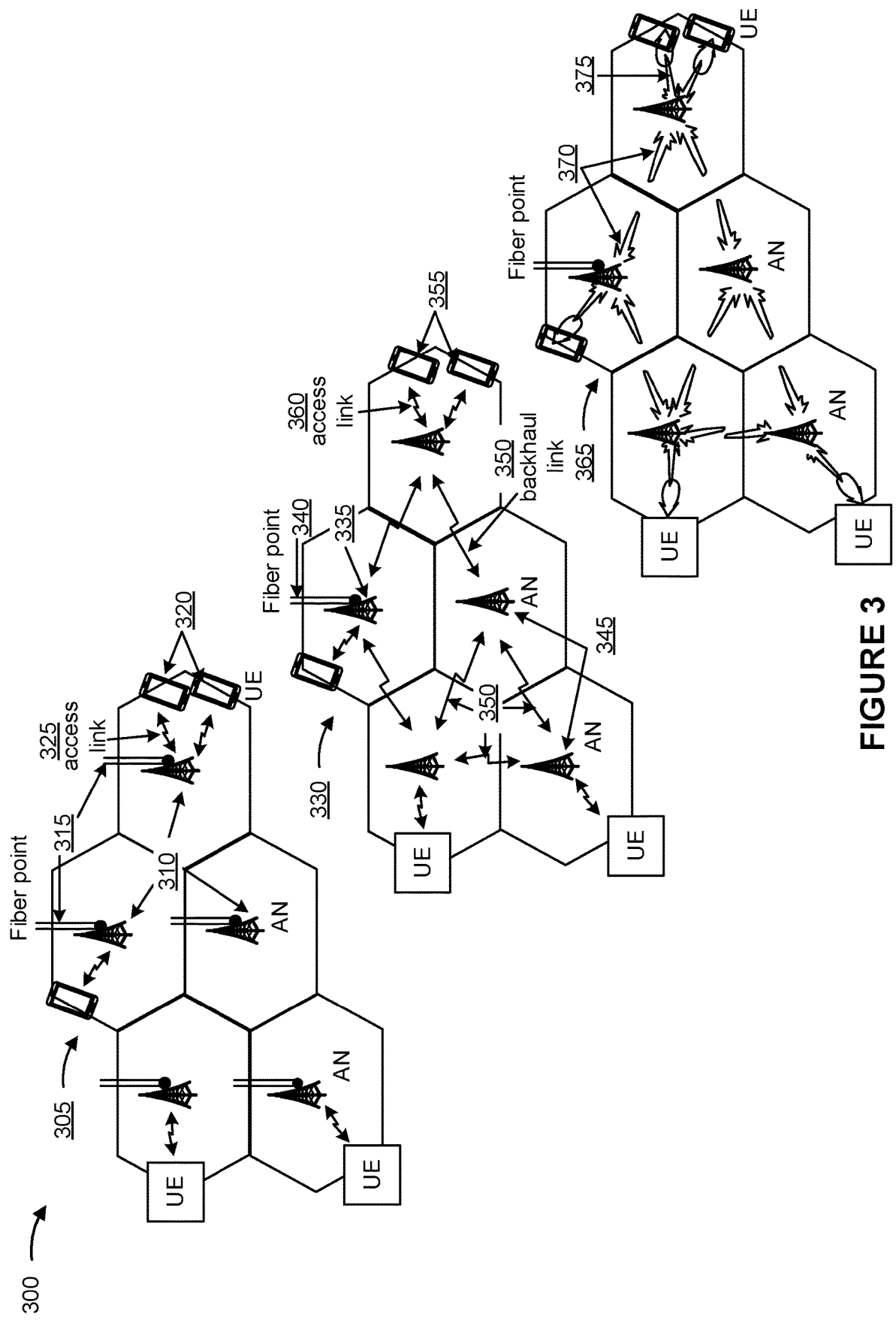
FIG. 3 is a diagram illustrating examples of radio access networks.

FIG. 3 is a diagram illustrating examples 300 of radio access networks.

As shown by reference number 305, a traditional radio access network, such as 3G, 4G, LTE, and so on, may include multiple base stations 310 (shown as access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network (RAN) may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 also may be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (such as via one or more non-anchor base stations 345) to form a backhaul path to the core network for carrying backhaul traffic. Backhaul link 350 may be a wireless link. Anchor base station(s) 335 and non-anchor base station(s) 345 may communicate with one or more UEs 355 via access links 360, which may be wireless links for carrying access traffic. In some aspects, an anchor base station 335 or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology or directional communications (such as beamforming) for communications between base stations and UEs (that is, between two base stations, between two UEs, or between a base station and a UE). For example, wireless backhaul links 370 between base stations may use millimeter wave signals to carry information, and may be directed toward a target base station using beamforming. Similarly, the wireless access links 375 between a UE and a base station may use millimeter wave signals and may be directed toward a target wireless node (such as a UE or a base station). In this way, inter-link interference may be reduced.

IAB networks may utilize relaying communications, as described herein. Some techniques described herein enable efficient acknowledgment among nodes of an IAB network in connection with relaying communications, such as by reducing the number of explicit transmissions of feedback. Such a reduction may be accomplished, for example, by implicitly providing feedback (for example, where a failure to receive feedback implies that a corresponding communication was received, or where receiving feedback for one communication implies that another communication was received) or by bundling feedback for multiple communications together in one message.

The configuration of base stations and UEs in FIG. 3 is shown as an example, and other examples are contemplated. For example, one or more base stations illustrated in FIG. 3 may be replaced by one or more UEs that communicate via a UE-to-UE access network (such as a peer-to-peer network or a device-to-device network). In this case, "anchor node" may refer to a UE that is directly in communication with a base station (such as an anchor base station or a non-anchor base station).

Figure 4:
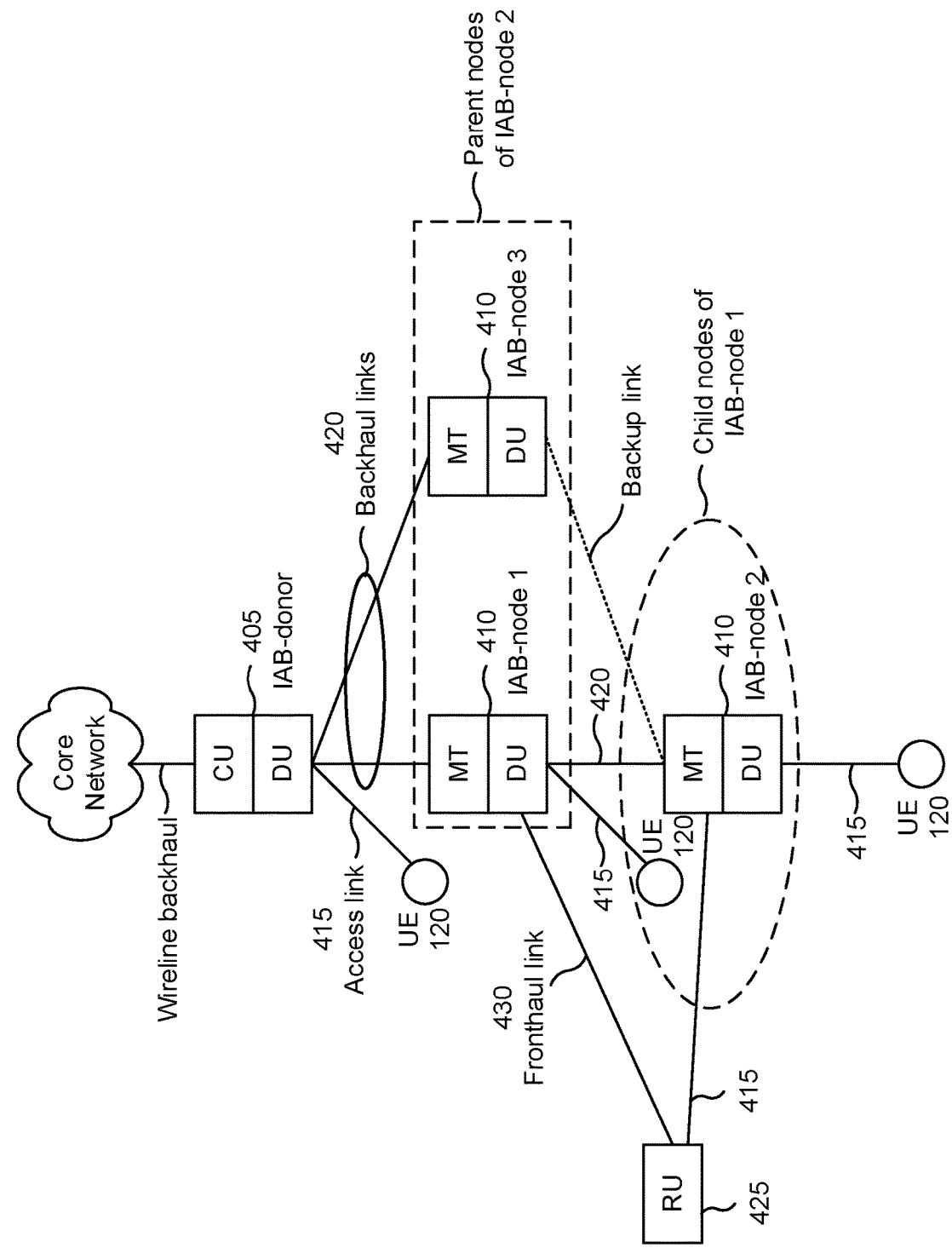
FIG. 4 is a diagram illustrating an example of an integrated access and backhaul (IAB) network architecture.

FIG. 4 is a diagram illustrating an example 400 of an IAB network architecture.

As shown in FIG. 4, an IAB network may include an IAB-donor 405 (shown as IAB-donor) that connects to a core network via a wired connection (shown as a wireline backhaul). For example, an Ng interface of an IAB-donor 405 may terminate at a core network. Additionally, or alternatively, an IAB-donor 405 may connect to one or more devices of the core network that provide a core access and mobility management function (AMF). In some aspects, an IAB-donor 405 may include a base station 110, such as an anchor base station, as described in connection with 3. As shown, an IAB-donor 405 may include a central unit (CU) (also referred to herein as a central node), which may perform access node controller (ANC) functions and AMF functions. The CU may configure one or more distributed units (DU)s of the IAB-donor 405 and may configure one or more IAB nodes 410 (such as an mobile termination (MT) unit or a DU of an IAB node 410) that connect to the core network via the IAB-donor 405. Thus, a CU of an IAB-donor 405 may control and configure the entire IAB network that connects to the core network via the IAB-donor 405, such as by using control messages and configuration messages (such as a radio resource control (RRC) configuration message or an F1 application protocol (F1AP) message). In some aspects, the one or more DUs may include an open RAN (O-RAN) DU and an O-RAN RU, as described herein.

In some aspects, the IAB network architecture may support O-RAN operability. O-RAN provides for disaggregation of hardware and software, as well as interfacing between hardware and software. In some aspects, O-RAN may use an architecture with a CU (such as a CU of IAB-donor 405), one or more DUs (which may be termed an O-RAN DU or O-DU), and one or more radio units (RUs) (which may be termed an O-RAN RU or O-RU). The RU may perform digital front end functions, some physical layer functions, digital beamforming, and so on. The DU may handle radio link control (RLC), medium access control (MAC), and some physical (PHY) layer functions. The CU may handle certain gNB functions, such as transfer of user data, mobility control, radio access network (RAN) sharing, positioning, session management, and so on. The CU may control the operation of one or more DUs, and the one or more DUs may control the operation of one or more RUs.

In some aspects, the CU may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU. The CU may be configured to handle user plane functionality (i.e., Central Unit-User Plane (CU-UP)), control plane functionality (i.e., Central Unit-Control Plane (CU-CP)), or a combination thereof. In some implementations, the CU can be logically split into one or more CU-UP units and one or more CU-CP units. The CU can be implemented to communicate with the DU, as necessary, for network control and signaling.

The DU may correspond to a logical unit that includes one or more base station functions to control the operation of one or more radio units (RUs). In some aspects, the DU may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a lower layer functional split. Each layer (or module) can be implemented with an interface configured to communicate signals with other layers (and modules) hosted by the DU, or with the control functions hosted by the CU.

Lower-level functionality can be implemented by one or more RUs. In some deployments, an RU, controlled by a DU, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the lower layer functional split. In such an architecture, the RU(s) can be implemented to handle over the air (OTA) communication with a UE 120. In some implementations, real-time and non-real-time aspects of control and user plane communication with the RU(s) can be controlled by the corresponding DU. In some scenarios, this configuration can enable the DU(s) and the CU to be implemented in a cloud-based RAN architecture, such as a virtual RAN (VRAN) architecture.

As further shown in FIG. 4, the IAB network may include IAB nodes 410 (shown as IAB-node 1, IAB-node 2, and IAB-node 3) that connect to the core network via the IAB-donor 405. As shown, an IAB node 410 may include MT functions (also sometimes referred to as UE functions (UEF)) and may include DU functions (also sometimes referred to as access node functions (ANF)). The MT functions of an IAB node 410 (referred to as a child node) may be controlled and scheduled by another IAB node 410 (referred to as a parent node of the child node) or by an IAB-donor 405. The DU functions of an IAB node 410 (a parent node) may control and schedule other IAB nodes 410 (child nodes of the parent node) and UEs 120. Thus, a DU may be referred to as a scheduling node or a scheduling component, and an MT may be referred to as a scheduled node or a scheduled component. In some aspects, an IAB-donor 405 may include DU functions and not MT functions. That is, an IAB-donor 405 may configure, control, and schedule communications of IAB nodes 410 and UEs 120. A UE 120 may include only MT functions, and not DU functions. That is, communications of a UE 120 may be controlled and scheduled by an IAB-donor 405 or an IAB node 410 (such as a parent node of the UE 120).

When a first node controls and schedules communications for a second node (such as when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and schedule communications for child nodes of the parent node. A parent node may be an IAB-donor 405 or an IAB node 410, and a child node may be an IAB node 410 or a UE 120. Communications of an MT function of a child node may be controlled and scheduled by a parent node of the child node.

As further shown in FIG. 4, a link between a UE 120 (which only has MT functions, and not DU functions) and an IAB-donor 405, or between a UE 120 and an IAB node 410, may be referred to as an access link 415. Access link 415 may be a wireless access link that provides a UE 120 with radio access to a core network via an IAB-donor 405, and optionally via one or more IAB nodes 410. Thus, the network illustrated in 4 may be referred to as a multi-hop network or a wireless multi-hop network.

As further shown in FIG. 4, a link between an IAB-donor 405 and an IAB node 410 or between two IAB nodes 410 may be referred to as a backhaul link 420. Backhaul link 420 may be a wireless backhaul link that provides an IAB node 410 with radio access to a core network via an IAB-donor 405, and optionally via one or more other IAB nodes 410. In an IAB network, network resources for wireless communications (such as time resources, frequency resources, and spatial resources) may be shared between access links 415 and backhaul links 420. In some aspects, a backhaul link 420 may be a primary backhaul link or a secondary backhaul link (also referred to as a backup backhaul link). In some aspects, a secondary backhaul link may be used if a primary backhaul link fails, becomes congested, or becomes overloaded. For example, a backup link between IAB-node 2 and IAB-node 3 may be used for backhaul communications if a primary backhaul link between IAB-node 2 and IAB-node 1 fails. As used herein, "node" or "wireless node" may refer to an IAB-donor 405 or an IAB node 410, among other examples described elsewhere herein.

In some aspects, an IAB node 410 (a parent node) may be unable to communicate with another IAB node 410 (a child node) using a direct access link. For example, IAB-node 2 may be outside of a communication range of IAB-node 1 or the direct access link between IAB-node 1 and IAB-node 2 may be blocked. IAB-node 1 may utilize a remote unit (RU) node 425 (such as a relay node or a repeater node) to communicate with IAB-node 2. The IAB-node 1 (that is, the DU of IAB-node 1) may communicate with the RU node 425 using a fronthaul link 430. For example, the IAB-node 1 may transmit a communication to the RU node 425 using the fronthaul link 430. The RU node 425 may forward the communication to the IAB-node 2 using an access link 415 between the IAB-node 2 and the RU node 425. In this way, the IAB-node 1 may extend coverage of the IAB-node 1 and communicate with the IAB-node 2 when the IAB-node 1 is unable to use a direct access link between IAB-node 1 and IAB-node 2 for direct communications. Some techniques described herein enable efficient feedback regarding the communication via the RU node 425. As some examples, techniques described herein provide for consolidating feedback regarding the communication on the fronthaul link 430 and the access link 415, or for providing implicit feedback regarding the communication on the fronthaul link 430 by way of feedback regarding the communication on the access link 415.

Figure 5:
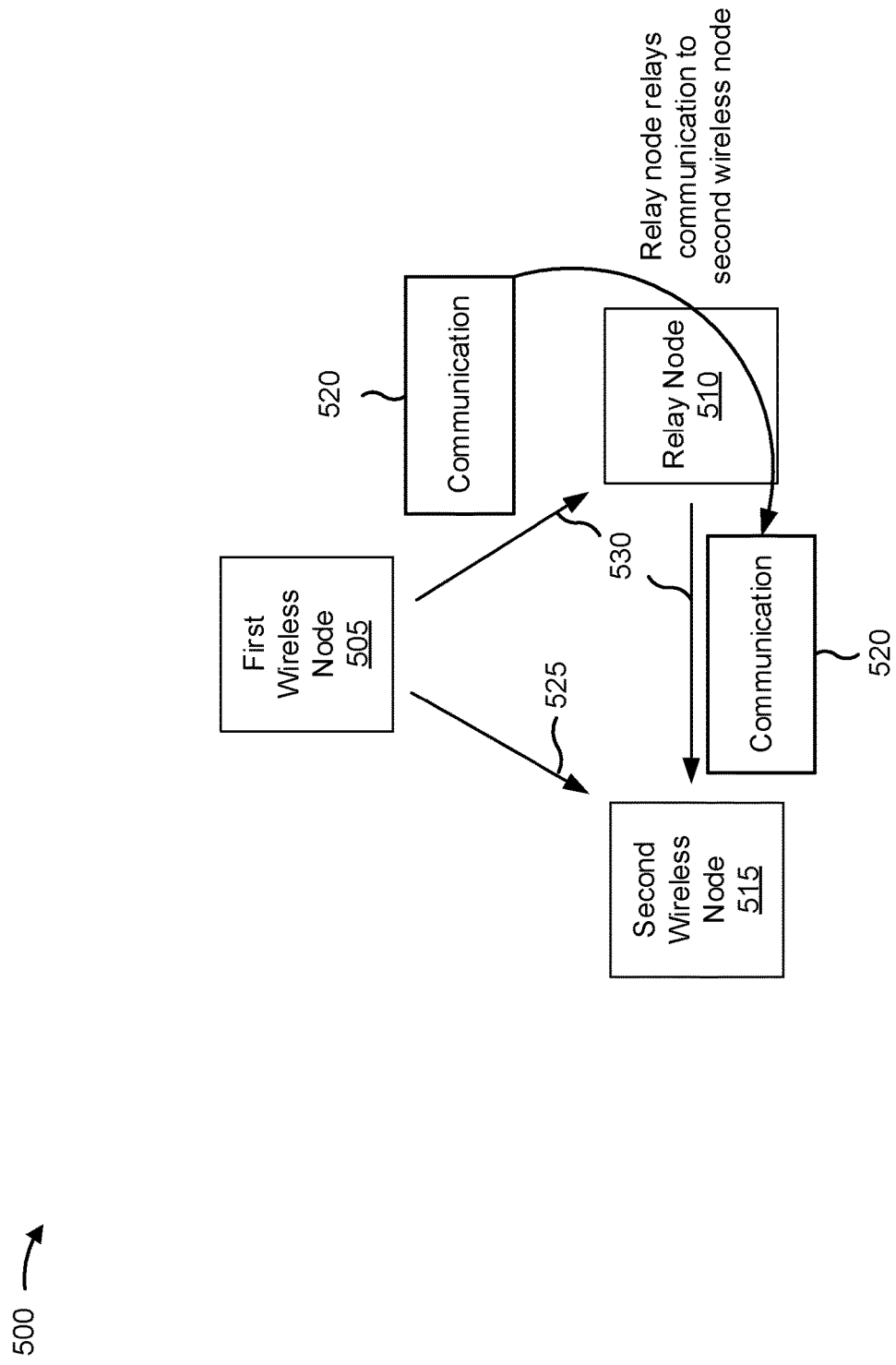
FIG. 5 is a diagram illustrating an example of a relay node that relays communications between a first wireless node and a second wireless node.

FIG. 5 is a diagram illustrating an example 500 of a relay node that relays communications between a first wireless node and a second wireless node. As shown, example 500 includes a first wireless node 505 (such as an IAB node, an IAB donor, a base station 110, or a UE 120), a relay node 510 (such as a relay device, a relay base station 110, an RU node 425, or a relay UE 120), and a second wireless node 515 (such as an IAB node, an IAB donor, a base station 110, an RU node 425, or a UE 120). In example 500, one or more of the first wireless node 505 and the second wireless node 515 may be aware of the relay node 510. In some aspects, the first wireless node 505 and the second wireless node 515 may be unaware of the relay node 510.

As shown in FIG. 5, the first wireless node 505 may determine to transmit a communication 520 (which may be a data communication, a control communication, or another form of communication) to the second wireless node 515 using a direct link 525 (an access link) between the first wireless node 505 and the second wireless node 515. However, the first wireless node 505 may be unable to transmit the communication 520 to the second wireless node 515 using the direct link 525. For example, the second wireless node 515 may be outside of a transmit range of the first wireless node 505 or the direct link 525 may be blocked.

Therefore, the first wireless node 505 may communicate with the second wireless node 515 using an indirect link 530. For example, the first wireless node 505 may transmit the communication 520 to the relay node 510. In some aspects, the first wireless node 505 may transmit the communication 520 directly to the relay node 510 (when the first wireless node 505 is aware of the relay node 510). In some aspects, the relay node 510 may be configured (by a control node not shown in FIG. 5 or by the second wireless node 515) to receive the communication 520 from the first wireless node 505 (such as if the first wireless node 505 is unaware of the relay node 510).

As shown in FIG. 5, the communication 520 may pass through the relay node 510 and be relayed by the relay node 510. For example, the relay node 510 may receive the communication 520 (as a first communication) and may generate another communication (referred to herein as a second communication) based on the communication 520. In some cases, an indirect link 530 may be an access link, a sidelink, or a fronthaul link. For example, if the first wireless node 505 is a base station 110, and the second wireless node 515 is a UE 120, the indirect link 530 between the first wireless node 505, and the relay node 510 may be a fronthaul link. The indirect link 530 between the relay node 510, and the second wireless node 515 may be an access link. Using the communication scheme shown in FIG. 5 may improve network performance and increase reliability by providing the first wireless node 505 and the second wireless node 515 with link diversity for communications and by extending a communication coverage area of the first wireless node 505 and the second wireless node 515. Techniques described herein provide efficient feedback regarding the communication 520. For example, the relay node 510 and the second wireless node 515 may provide multiplexed feedback via a single message. As another example, feedback from the second wireless node 515 regarding the communication 520 may provide implicit feedback regarding the reception of the communication 520 by the relay node 510.

Figure 6:
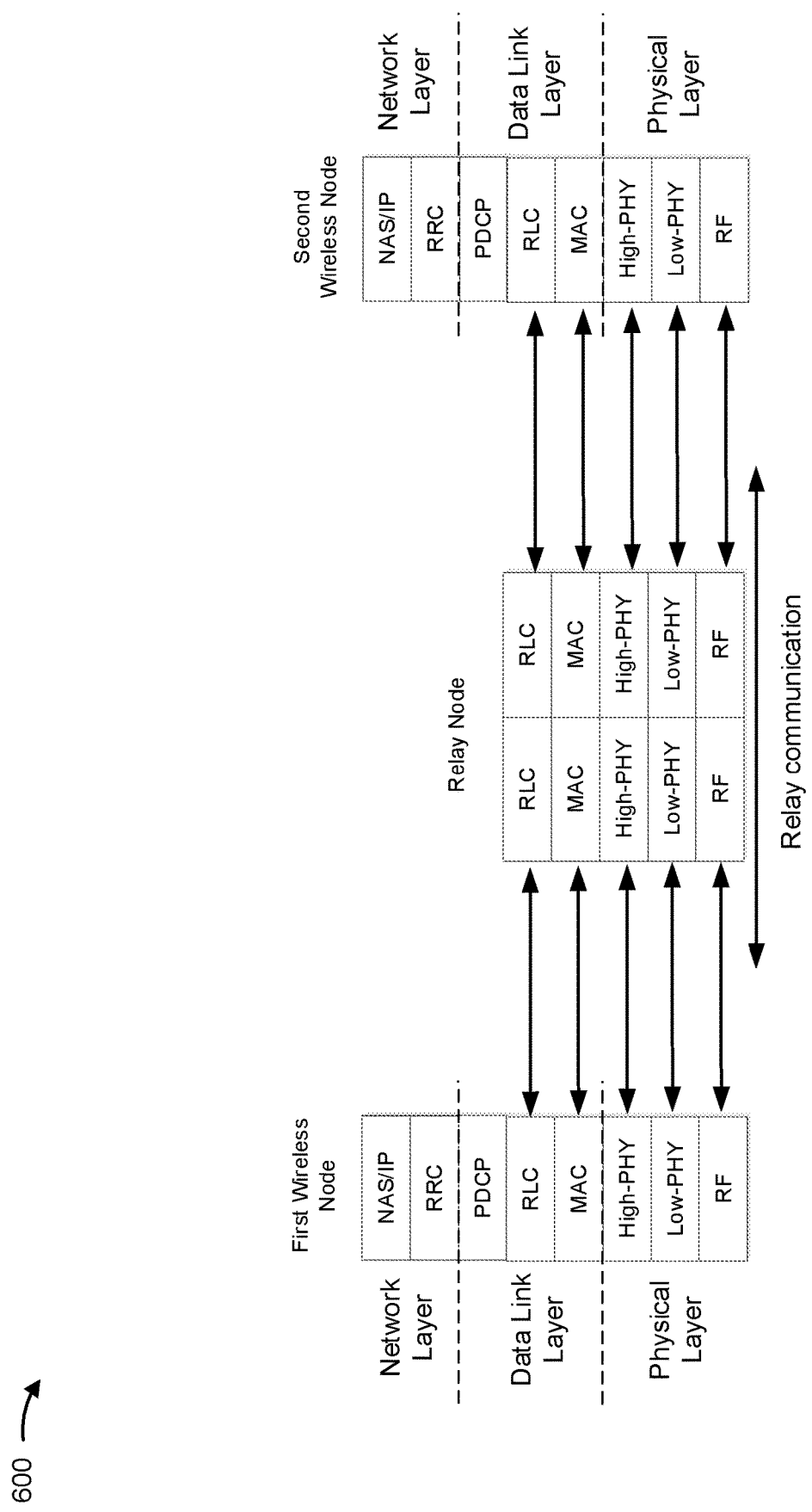
FIG. 6 is a diagram illustrating an example of a protocol stack for relaying communications between a first wireless node and second wireless node.

FIG. 6 is a diagram illustrating an example 600 of a protocol stack for relaying communications between a first wireless node and second wireless node.

As shown in FIG. 6, an NR protocol stack implemented on a first wireless node and on a second wireless node includes a network layer (sometimes referred to as Layer 3), a data link layer (sometimes referred to as Layer 2) and a physical layer (sometimes referred to as Layer 1). The network layer may include a non-access stratum (NAS) layer, an internet protocol (IP) layer, and an RRC layer. The data link layer may include a packet data convergence protocol (PDCP) layer, a radio link control (RLC) layer, and a medium access control (MAC) layer. The physical layer may include a high-physical (PHY) layer, a low-PHY layer, and a radio frequency (RF) layer. In some aspects, the PDCP layer on a wireless node may include an adaptation sub-layer (such as a service data adaptation protocol (SDAP) sub-layer).

In some aspects, such as in an IAB network, one or more of the NAS layer, the IP layer, the RRC layer, and the PDCP layer may be included in a CU of an IAB donor. The remaining layers (that is, the RLC layer, the MAC layer, the high-PHY layer, the low-PHY layer, and the RF layer) may be included in a DU of an IAB donor or of an IAB node.

When communicating directly with the second wireless node, the first wireless node may communicate at an RLC layer, a MAC layer, a high-PHY layer, a low-PHY layer, or an RF layer. As shown in FIG. 6, the layers in the first wireless node may communicate with corresponding layers in the second wireless node. However, in a relay scenario, the first wireless node may communicate via a link (such as an access link or a fronthaul link) with a relay node. For example, to enable Layer 2 relaying (that is, data link layer relaying) between the first wireless node and the second wireless node, the relay node may include an RLC layer, a MAC layer, a high-PHY layer, a low-PHY layer, and an RF layer to communicate with a corresponding RLC layer, MAC layer, high-PHY layer, low-PHY layer, and RF layer of the first wireless node and second wireless node. Based on passing information between these layers, the relay node enables Layer 2 relaying between the first wireless node and the second wireless node. A relay node that performs Layer 2 relaying as described herein may be referred to as a Layer 2 relay node.

In some aspects, the relay node may utilize Layer 1 relaying (sometimes referred to as physical layer relaying). For example, the relay node may not include an RLC layer or a MAC layer. As the relay node may not include an RLC or MAC layer, the relay node may be configured and scheduled by a control node (such as a CU, an IAB donor, and IAB node, a base station 110, the first wireless node, or the second wireless node). The relay node may communicate with the first wireless node and the second wireless node at the physical layer only (rather than the data link layer and the physical layer). Based on passing information between these layers, the relay node enables Layer 1 relaying between the first wireless node and the second wireless node. A relay node that performs Layer 1 relaying as described herein may be referred to as a Layer 1 relay node.

Figure 7A:
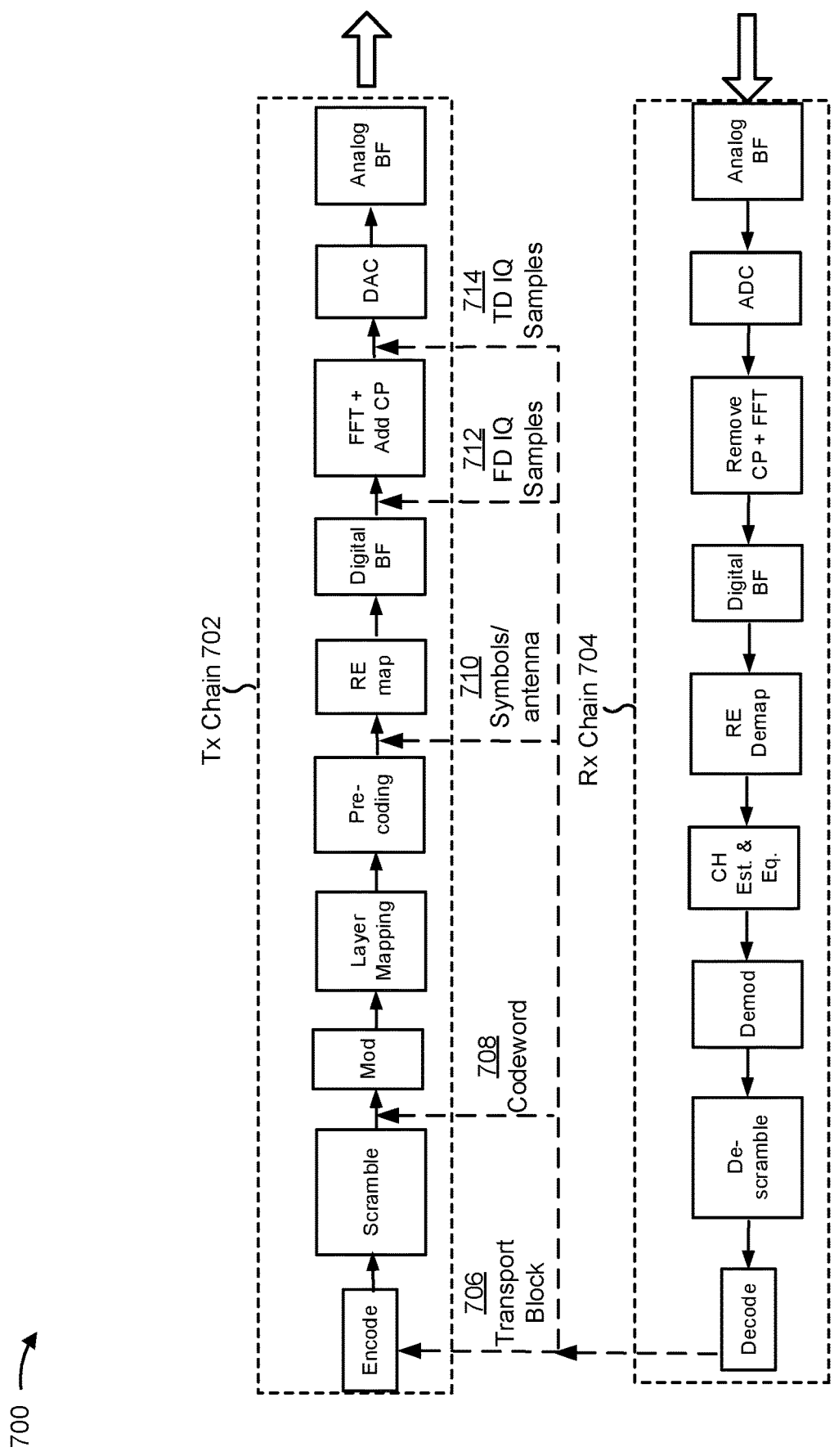
FIGS. 7A and 7B are diagrams illustrating examples of transmit (Tx) and receive (Rx) chains of a Layer 1 relay node.
Figure 7B:
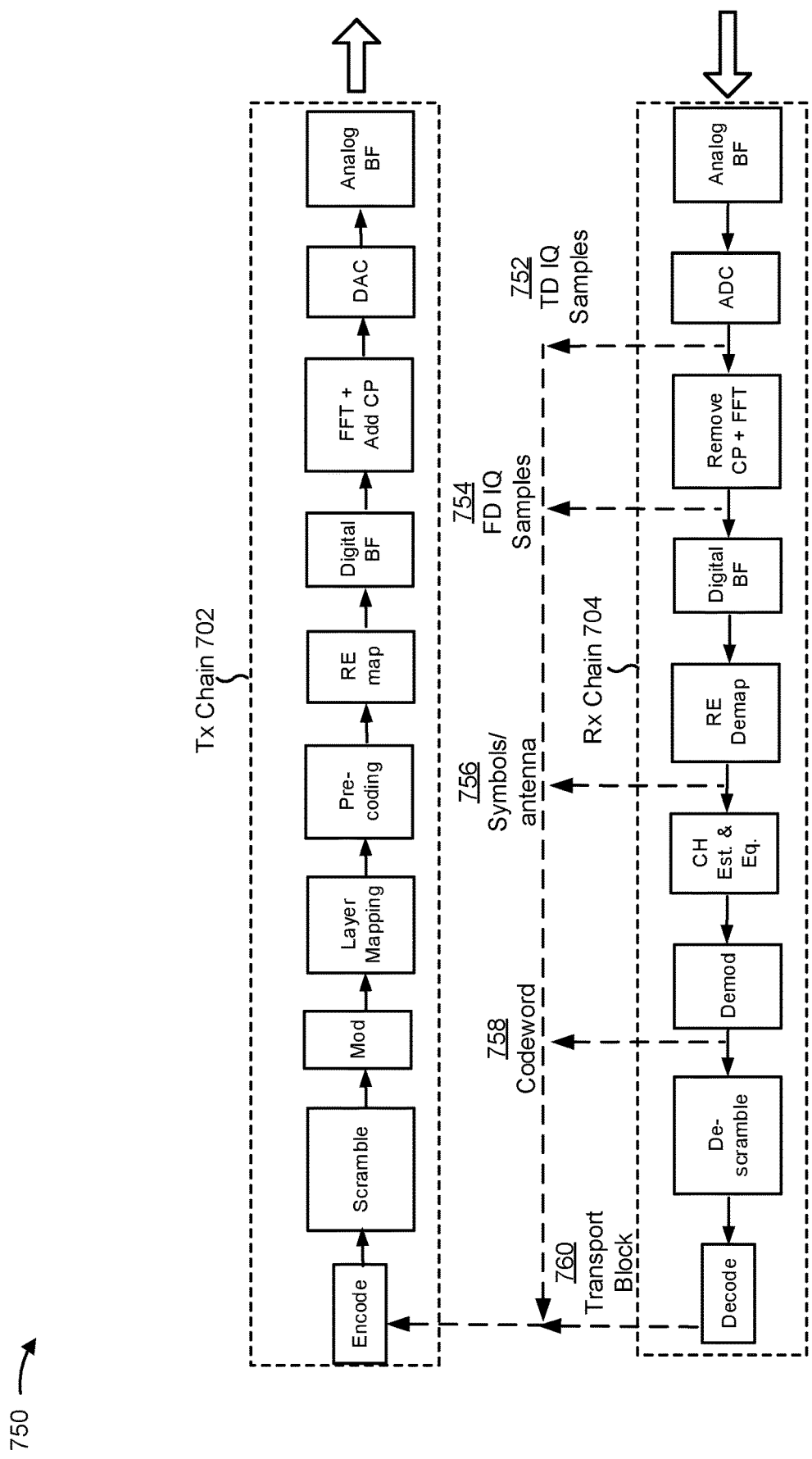

FIGS. 7A and 7B are diagrams illustrating examples 700 and 750 of transmit (Tx) and receive (Rx) chains of a Layer 1 relay node.

In some aspects, one or more components of Tx chain 702 may be implemented in transmit processor 264, TX MIMO processor 266, MOD/DEMOD 254, controller/processor 280, or another component described in connection with FIG. 2. In some aspects, Tx chain 702 may be implemented in a relay node (such as RU node 425, relay node 510, or relay node 1315 described with reference to FIGS. 4, 5, and 13, respectively) for transmitting an outgoing signal (such as uplink data, downlink data, an uplink reference signal, a downlink reference signal, uplink control information, or downlink control information) associated with a relaying operation performed by the relay node.

In some aspects, one or more components of Rx chain 704 may be implemented in receive processor 258, MIMO detector 256, MOD/DEMOD 254, or controller/processor 280, as described in connection with FIG. 2. In some aspects, Rx chain 704 may be implemented in a relay node for receiving an incoming signal (such as downlink data, uplink data, a downlink reference signal, an uplink reference signal, downlink control information, or uplink control information) associated with a relaying operation performed by the relay node.

As shown in FIG. 7A and example 700, the relay node may receive the incoming signal over a fronthaul link. For example, the incoming signal may be downlink information received from a DU of an IAB node, a base station 110, or a similar device. As shown in FIG. 7A, the incoming signal may be processed by the Rx chain 704. For example, the relay node may fully decode the incoming signal to determine information (such as a payload) carried by the incoming signal. The relay node may perform analog beamforming on the incoming signal. The relay node may convert the incoming signal from the analog domain to the digital domain using an analog-to-digital converter (ADC). The relay node may remove a cyclic prefix (CP) and perform a Fast Fourier Transform (FFT) associated with the incoming signal. The relay node may perform a digital beamforming process on the incoming signal (such as based on a digital Tx beamforming configuration). The relay node may perform an RE de-mapping procedure based on an RE mapping configuration received by the relay node to identify REs of the signal and occupied tones. The relay node may perform channel estimation and channel equalization on the incoming signal to identify and remove noise associated with the incoming signal. The relay node may perform a demodulation procedure on the incoming signal. The relay node may de-scramble the incoming signal, such as using scrambling IDs associated with the incoming signal. The relay node may decode the incoming signal, such as based on an MCS associated with the incoming signal.

After decoding the incoming signal, the relay node may identify information carried by the incoming signal. For example, a payload of the incoming signal may include time domain in-phase/quadrature (IQ) samples, frequency domain IQ samples, symbols per antenna (IQ symbols of occupied tones), a codeword, a transport block, or similar examples. The relay node may generate an outgoing signal using the Tx chain 702. An amount or level of processing performed by the relay node associated with the Tx chain 702 may be based on the information carried by the incoming signal, a configuration received by the relay node (such as from a control node), or other factors.

As shown by reference number 706, if the incoming signal is carrying a transport block, the relay node may generate the outgoing signal by fully encoding the transport block to form the outgoing signal (such as by encoding the transport block according to a Tx MCS, scrambling the encoded transport block, modulating the scrambled transport block, performing layer mapping, pre-coding, performing digital Rx beamforming, applying one or more of an FFT or a CP, converting the signal from the digital domain to the analog domain with a digital-to-analog converter (DAC), performing analog beamforming, and transmitting the outgoing signal).

As shown by reference number 708, if the incoming signal is carrying a codeword, the relay node may not perform encoding or scrambling to generate the outgoing signal. That is, the relay node may modulate the codeword, perform layer mapping, perform pre-coding, perform digital Rx beamforming, apply one or more of an FFT or a CP, convert the signal from the digital domain to the analog domain with a DAC, perform analog beamforming, and transmit the outgoing signal.

As shown by reference number 710, if the incoming signal is carrying an indication of symbols per antenna (such as IQ symbols of occupied tones), the relay node may not perform encoding, scrambling, modulating, layer mapping, or pre-coding. That is, the relay node may perform digital Rx beamforming to the IQ symbols of occupied tones, apply one or more of an FFT or a CP, convert the signal from the digital domain to the analog domain with a DAC, perform analog beamforming, and transmit the outgoing signal.

As shown by reference number 712, if the incoming signal is carrying frequency domain IQ samples, the relay node may not perform encoding, scrambling, modulating, layer mapping, pre-coding, or digital beamforming. That is, the relay node may apply one or more of an FFT or a CP to the frequency domain IQ samples, convert the signal from the digital domain to the analog domain with a DAC, perform analog beamforming, and transmit the outgoing signal.

As shown by reference number 714, if the incoming signal is carrying time domain IQ samples, the relay node may not perform encoding, scrambling, modulating, layer mapping, pre-coding, digital beamforming, FFT application, or CP addition. That is, the relay node may convert the time domain IQ samples from the digital domain to the analog domain with a DAC, perform analog beamforming, and transmit the outgoing signal.

As a result, the level of digital processing used to generate the outgoing signal may vary based on information carried by the incoming signal. The relay node may process the incoming signal to identify information included in a payload of the incoming signal. The relay node may generate an outgoing signal based on the information carried by the incoming signal.

As shown in FIG. 7B and example 750, the relay node may receive an incoming signal over an access link. For example, the incoming signal may be uplink information received from a device such as an MT unit of an IAB node or a UE 120. In some aspects, the device transmitting the incoming signal may be unaware of the relay node. In some other aspects, the device transmitting the incoming signal may be aware of the relay node.

A relay node may perform a level of digital processing to determine information associated with the incoming signal. The level of digital processing may be based on a configuration received by the relay node (such as from a control node). For example, as shown by reference number 752, the relay node may process the incoming signal to determine time domain IQ samples associated with the incoming signal. The relay node may generate the outgoing signal by processing the time domain IQ samples and including them in a payload of the outgoing signal, such as by fully encoding a transport block indicating the time domain IQ samples. The outgoing signal may be transmitted using a fronthaul link to another wireless node.

As shown by reference number 754, the relay node may process the incoming signal to determine frequency domain IQ samples associated with the incoming signal. The relay node may generate the outgoing signal by processing the frequency domain IQ samples and including them in a payload of the outgoing signal, such as by fully encoding a transport block indicating the frequency domain IQ samples. The outgoing signal may be transmitted using a fronthaul link to another wireless node.

As shown by reference number 756, the relay node may process the incoming signal to determine symbols per antennas (such as IQ symbols of occupied tones) associated with the incoming signal. The relay node may generate the outgoing signal by processing the symbols per antenna and including them in a payload of the outgoing signal, such as by fully encoding a transport block indicating the symbols per antenna. The outgoing signal may be transmitted using a fronthaul link to another wireless node.

As shown by reference number 758, the relay node may process the incoming signal to determine a received codeword (that is, log likelihood ratio (LLR) values associated with the incoming signal) associated with the incoming signal. The relay node may generate the outgoing signal by processing the received codeword and including it in a payload of the outgoing signal, such as by fully encoding a transport block indicating the received codeword. The outgoing signal may be transmitted using a fronthaul link to another wireless node.

As shown by reference number 760, the relay node may process the incoming signal to determine a transport block associated with the incoming signal. For example, the relay node may fully decode the incoming signal. The relay node may generate the outgoing signal by processing the transport block and including the transport block in a payload of the outgoing signal, such as by fully encoding a transport block. The outgoing signal may be transmitted using a fronthaul link to another wireless node.

The level of processing performed on the incoming signal may be configured by a control node or another wireless node. The outgoing signal may include information about the incoming signal based on the level of processing performed by the relay node.

FIGS. 8-12 are diagrams illustrating examples 800, 900, 1000, 1100, 1105, and 1200 of various approaches for efficient acknowledgment by relay nodes. In FIGS. 8-12, "FH" denotes a communication via a fronthaul link (such as between a first wireless node and a relay node, etc.). For example, "FH PDSCH" indicates a physical downlink shared channel (PDSCH) transmitted via a fronthaul, and "FH PDCCH" indicates a physical downlink control channel (PDCCH) transmitted via a fronthaul. Generally, the absence of "FH" in FIGS. 8-12 indicates that a communication is via an access link, though it should be understood that the link between the relay node and the second wireless node can be a fronthaul link. For example, "PDSCH" may indicate a PDSCH transmitted via an access link (though it should be understood that this PDSCH also can be transmitted via a fronthaul). Generally, FIGS. 8-12 show examples of how a relay node can defer or skip transmission of feedback regarding a first communication (that is, a communication from an upstream node carrying a payload for a target node), which improves efficiency of feedback reporting for the first wireless node and the relay node. By improving the efficiency of feedback reporting, the number of hops that can be included in such a relaying operation is increased and throughput of the relaying operation is increased.

FIGS. 8-12 include a first wireless node 505, a relay node 510, and a second wireless node 515. In some aspects, the first wireless node 505 may be a base station 110, a UE 120, a base station 310, an anchor base station 335, a non-anchor base station 345, an IAB-donor 405, an IAB node 410, a DU of an IAB node 410, or a relay node 510. In some aspects, the relay node 510 may be a base station 110, a UE 120, a base station 310, an anchor base station 335, a non-anchor base station 345, an IAB-donor 405, an IAB node 410, a DU of an IAB node 410, or a first wireless node 505. In some aspects, the second wireless node 515 node may be a base station 110, a UE 120, a base station 310, an anchor base station 335, a non-anchor base station 345, an IAB-donor 405, an IAB node 410, a DU of an IAB node 410, or a relay node 510. Some of the examples of FIGS. 11A and 11B involve multi-hop networks, in which multiple relay nodes 510 are provided between a first wireless node 505 and a second wireless node 515. The techniques described with regard to FIGS. 8-12 can be implemented in multi-hop networks.

Figure 8:
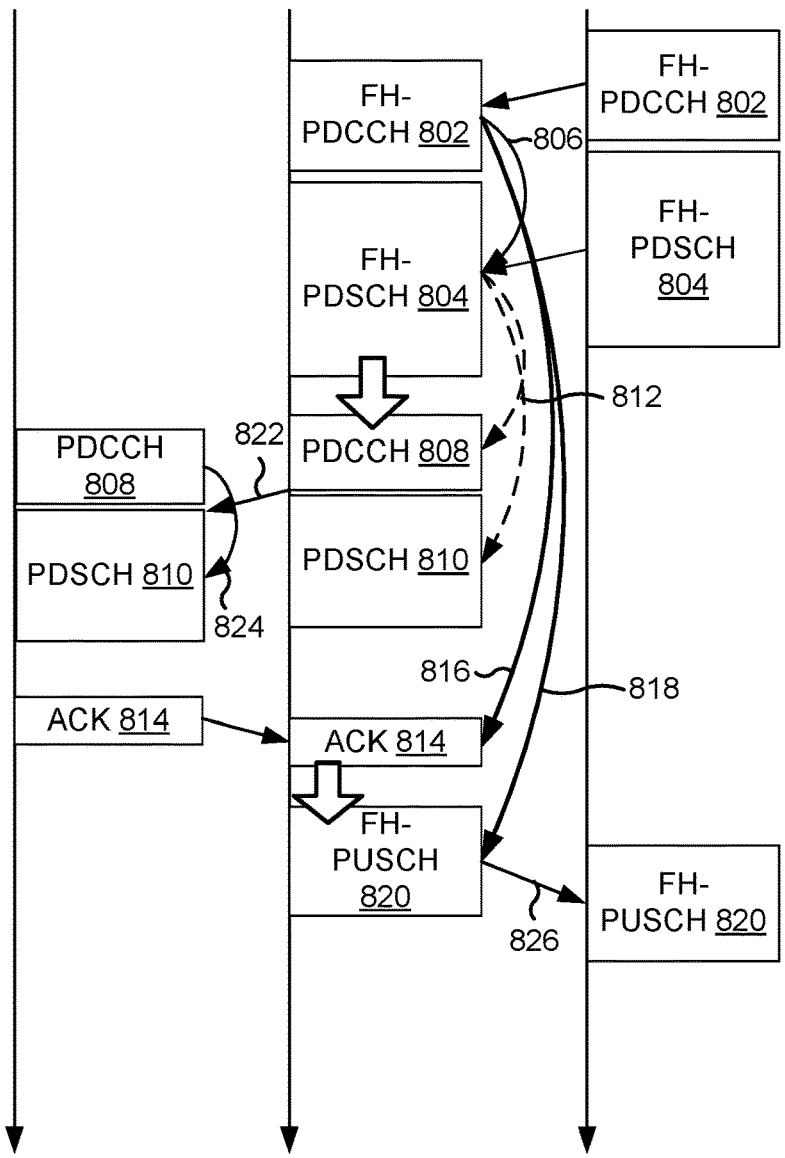
FIGS. 8-12 are diagrams illustrating examples of various approaches for efficient acknowledgment by relay nodes.

FIG. 8 shows an example where the relay node 510 skips transmission of an acknowledgment for a first communication to the first wireless node 505. For example, the relay node 510 may not dynamically transmit feedback (such as an ACK/NACK regarding the first communication) to the first wireless node 505.

As shown, the first wireless node 505 may transmit a first communication to the relay node 510. As further shown, the first communication may include at least one of an FH-PDCCH 802 or an FH-PDSCH 804. The FH-PDCCH 802, and other communications of FIGS. 8-12, are shown on a timeline associated with the first wireless node 505 (illustrating transmission of the FH-PDCCH 802) and on a timeline associated with the relay node 510 (illustrating reception of the FH-PDCCH 802). In some aspects, the FH-PDCCH 802 may schedule the FH-PDSCH 804, as indicated by the curved arrow 806 from the FH-PDCCH to the FH-PDSCH. The FH-PDSCH 804 may carry a payload to be relayed to the second wireless node 515 via a second communication generated by the relay node 510. The second communication includes the PDCCH 808 and the PDSCH 810. The dashed arrows indicated by reference number 812 indicate that the payload is to be relayed via the second communication. As shown, the relay node 510 does not provide, to the first wireless node 505, explicit feedback regarding the reception of the first communication. For example, the relay node 510 may not provide a typical hybrid automatic repeat request (HARD) ACK/NACK in accordance with a dynamic feedback scheme. Thus, the relay node 510 may reduce overhead between the first wireless node 505 and the second wireless node 515.

In some aspects, the FH-PDCCH may carry information associated with relaying feedback 814 from the second wireless node 515 to the first wireless node 505, as indicated by the curved arrows 816 and 818 from the FH-PDCCH to the feedback 814 and the frequency hopping physical uplink shared channel (FH-PUSCH) 820. Generally, feedback may be relayed from the second wireless node 515 to the first wireless node 505 via a third communication, which may include a fronthaul physical uplink control channel (FH-PUCCH) (not illustrated in FIG. 8) or an FH-PUSCH 820. "Third communication" can refer to one or more of the FH-PUCCH or the FH-PUSCH 820. For example, the FH-PDCCH may carry a forward control command that indicates a resource or a configuration for an FH-PUSCH or an FH-PUCCH carrying the feedback 814. In some aspects, the FH-PDCCH 802 may carry information indicating a resource on which the feedback 814 may be received, information used for decoding the feedback 814, or the like.

The first communication may carry information for transmitting the second communication, as indicated by the dashed arrows, shown by reference number 812, from the FH-PDSCH 804 to the PDCCH 808 and the PDSCH 810 of the second communication. In some aspects, the information for transmitting the second communication may be carried in the FH-PDCCH 802.

As shown by reference number 822, the relay node 510 may transmit the second communication to the second wireless node 515. For example, the relay node 510 may transmit a PDCCH 808 scheduling a PDSCH 810 (as indicated by the curved arrow 824 from the PDCCH 808 to the PDSCH 810) and may transmit the PDSCH 810 carrying the payload received via the first communication. The second wireless node 515 may or may not receive the second communication. For example, the second wireless node 515 may fail to receive the PDCCH 808, meaning that the second wireless node 515 is unaware of the transmission of the PDSCH 810 of the second communication. If the second wireless node 515 fails to receive the PDCCH 808, then the second wireless node 515 may not transmit the indication of whether the second wireless node 515 received the second communication (that is, the feedback 814). As another example, the second wireless node 515 may receive the PDCCH 808, and may fail to decode the PDSCH 810 scheduled by the PDCCH 808. If the second wireless node 515 fails to decode the PDSCH 810, the second wireless node 515 may transmit a NACK as the indication of whether the second wireless node 515 received the second communication. In example 800, the second wireless node 515 successfully receives the communication, so the second wireless node 515 transmit an ACK as the indication of whether the second wireless node 515 received the second communication. In some aspects, the indication of whether the second wireless node 515 received the second communication may include HARQ feedback, such as a HARQ ACK/NACK.

As shown by reference number 826, if the relay node 510 receives the indication of whether the second wireless node 515 received the second communication, the relay node 510 may forward the indication of whether the second wireless node 515 received the second communication via an FH-PUSCH 820. In some aspects, the relay node 510 may perform this forwarding via an FH-PUCCH (not illustrated in FIG. 8). The relay node 510 may perform this forwarding in accordance with control information carried by the FH-PDCCH 802 of the first communication. In some aspects, the FH-PDCCH 802 (that carries the control information for the forwarding of the indication) may be coded into an FH-PDSCH, such as FH-PDSCH 804. For example, the FH-PDSCH 804 of the first communication may carry the payload and an FH-PDCCH 802 that schedules the FH-PUCCH (or FH-PUSCH 820) for providing the feedback 814.

In some aspects, the relay node 510 may interpret or process the first wireless node 505's feedback 814. For example, the relay node 510 may be capable of decoding the indication of whether the second wireless node 515 received the second communication. In such a case, the relay node 510 may provide, to the first wireless node 505, an ACK/NACK based on the indication, or may handle retransmission of the second communication based on the indication.

The first wireless node 505 can determine whether the transmission of the FH-PDSCH 804 and the second communication were successful based on whether the FH-PUSCH 820 (or FH-PUCCH) were received and based on whether the UE indicates an ACK, a NACK, or neither. For example, if the first wireless node 505 receives an ACK from the second wireless node 515 (via the relay node 510), then the first wireless node 505 may determine that the end-to-end transmission of the payload was successful. If the first wireless node 505 receives a NACK from the second wireless node 515 (via the relay node 510), then the first wireless node 505 may determine that the first communication was successful and the end-to-end transmission of the payload was unsuccessful (that is, that the second wireless node 515 failed to receive the first communication). If the first wireless node 505 cannot decode the feedback 814, or if the relay node 510 indicates that the relay node 510 could not decode the feedback 814, then the first wireless node 505 may determine that the FH-PDCCH 802 of the first communication was received, but may not be capable of determining whether failure occurred at the FH-PDSCH 804 or in the second communication (that is the PDCCH 808 or the PDSCH 810). If the first wireless node 505 does not receive the FH-PUSCH 820 (or FH-PUCCH), then the first wireless node 505 may determine that transmission of the FH-PDCCH 802 has failed. Thus, the relay node 510 can implicitly provide feedback regarding the first communication by forwarding (or providing information indicating) the feedback from the second wireless node 515. In other words, the feedback regarding the first communication is implicit in association with the indication of whether the second wireless node 515 received the second communication.

If the first wireless node 505 identifies a failure of the relay node 510 to receive the first communication (that is, the FH-PDCCH 802 or the FH-PDSCH 804), the first wireless node 505 may perform another end-to-end transmission of the payload, such as via the relay node 510. If the first wireless node 505 identifies a failure of the second communication (that is, the PDCCH 808 or the PDSCH 810), the first wireless node 505 may instruct the relay node 510 to retransmit the second communication. If the first wireless node 505 is incapable of determining whether failure occurred at the FH-PDSCH or in the second communication, the first wireless node 505 may perform another end-to-end transmission of the payload.

Figure 9:
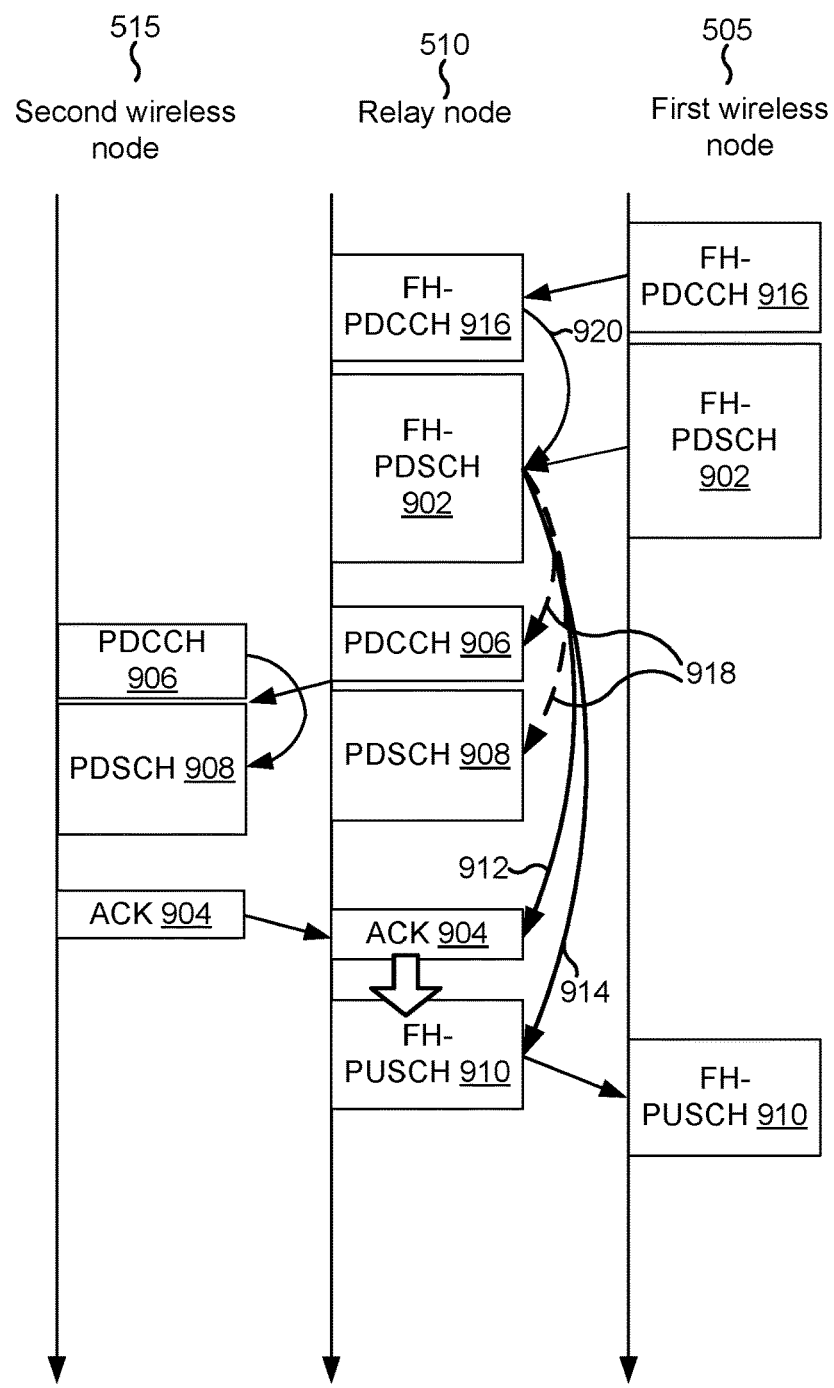

FIG. 9 shows an example of how ambiguity between whether failure occurred at the first communication (that is, the FH-PDSCH 902) or the second communication can be resolved. In example 900 of FIG. 9, the FH-PDSCH 902 of the first communication (which may be a single FH-PDSCH 902) carries the payload to be forwarded to the second wireless node 515, control information scheduling a PDCCH 906 and a PDSCH 908 (or the PDCCH 906 may schedule the PDSCH 908), and control information indicating a resource or configuration for forwarding the indication 904 of whether the second wireless node 515 received the second communication (one or more of the PDCCH 906 or the PDSCH 908) via an FH-PUSCH 910. In some aspects, the FH-PDSCH 902 may carry one or more headers carrying a forward control command indicating the resource or configuration, as indicated by the curved arrow 912 from the FH-PDSCH to the indication 904 (that is, the ACK) and the curved arrow 914 to the FH-PUSCH shown by reference number 910. Note that, in example 900, the relay node 510 does not provide explicit feedback (such as HARQ ACK/NACK feedback or a dynamic indication) regarding the reception of the first communication. Furthermore, the first communication may carry information for transmitting the second communication, as indicated by the dashed arrows 918 from the FH-PDSCH 902 to the PDCCH 906 and the PDSCH 908 of the second communication.

If the first wireless node 505 receives the FH-PUSCH 910 (or FH-PUCCH) scheduled by the FH-PDSCH 902, the first wireless node 505 can determine that the FH-PDSCH 902 was received by the relay node 510. Thus, the reception of the FH-PUSCH 910 or FH-PUCCH implicitly provides feedback regarding reception of the first communication (that is, feedback regarding the second communication is implicit). Furthermore, since the FH-PUCCH or FH-PUSCH 910 is expected to carry an indication of whether the second wireless node 515 received the second communication (that is, the PDCCH 906 and the PDSCH 908), the first wireless node 505 can determine whether the second wireless node 515 received the PDCCH 906 of the second communication, the PDSCH 908 of the second communication, or both. Thus, ambiguity, which may arise as a result of providing the resource or configuration for the FH-PUCCH and FH-PUSCH 910 in the FH-PDCCH 916 that schedules the FH-PDSCH 902 (as indicated by the arrow shown by reference number 920), is eliminated. If the first wireless node 505 determines that the relay node 510 successfully received the FH-PDSCH and that the second wireless node 515 failed to receive the second communication, the first wireless node 505 may trigger the relay node 510 to retransmit the second communication.

Figure 10:
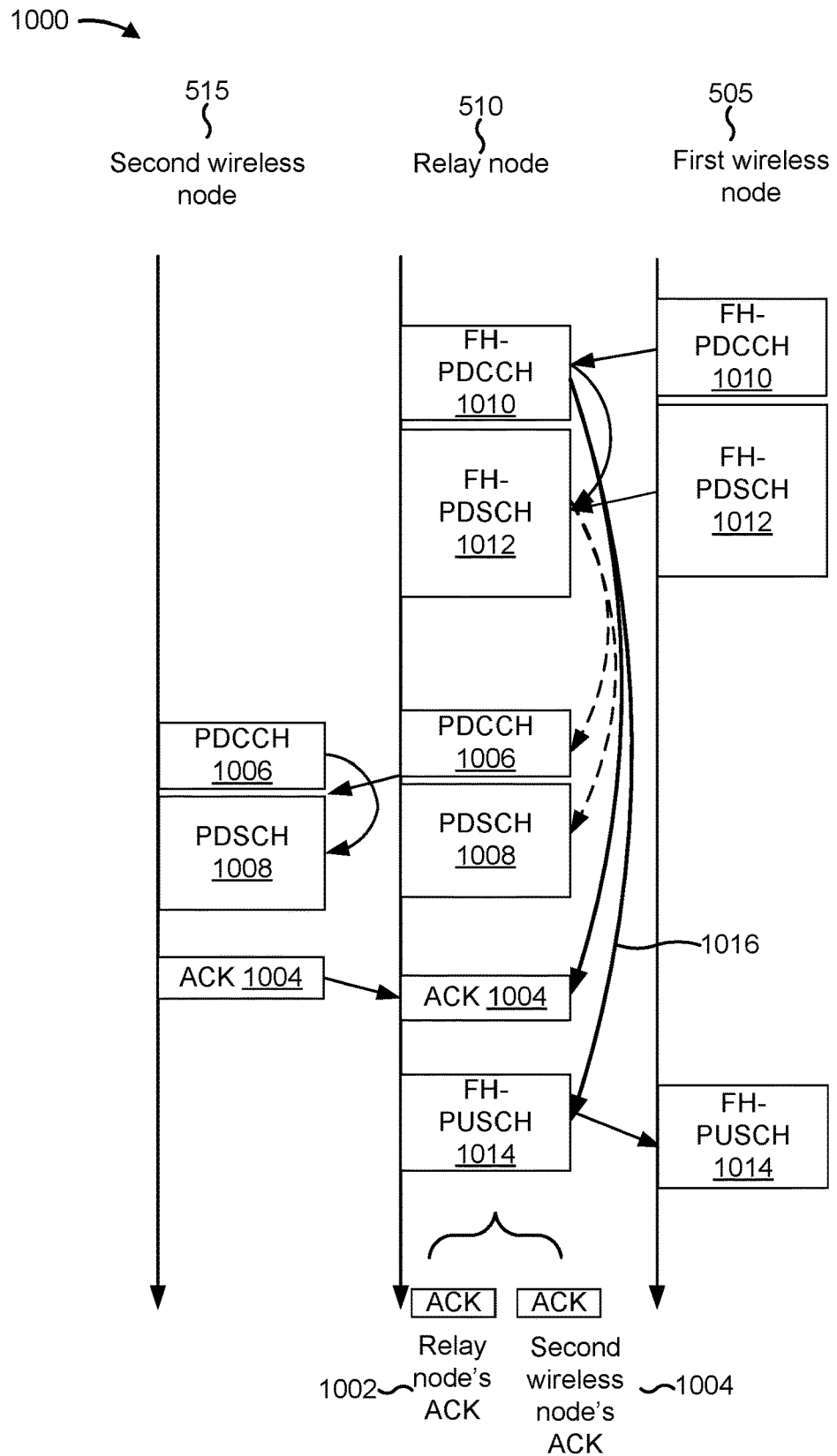

FIG. 10 shows an example where transmission of the relay node 510's indication 1002 regarding the first communication is deferred until transmission of an indication 1004 of whether the second wireless node 515 received the second communication (including the PDCCH 1006 and the PDSCH 1008). In example 1000, the relay node 510 receives a first communication carrying a payload from the first wireless node 505. The first communication may include a FH-PDCCH 1010 that schedules an FH-PDSCH 1012, as indicated by the arrow from the FH-PDCCH 1010 to the FH-PDSCH 1012, and the FH-PDSCH 1012 that schedules the PDCCH 1006 and the PDSCH 1008, as indicated by the dashed arrows from the FH-PDSCH 1012 to the PDCCH 1006 and the PDSCH 1008. In some aspects, the FH-PDCCH 1010 may carry information associated with relaying the indication 1004 from the second wireless node 515 to the first wireless node 505, as indicated by the curved arrow from the FH-PDCCH to the indication 1004.

The relay node 510 generates feedback (such as an indication 1002 of whether the relay node 510 received the first communication) based on receiving the first communication. The relay node 510 may generate the second communication to convey the payload to the second wireless node 515 based on the first communication. As shown, the relay node 510 may provide the indication 1002 with an indication of whether the second wireless node 515 successfully received the second communication, such as via an FH-PUSCH 1014 or an FH-PUCCH. In FIG. 10, the FH-PUSCH 1014 is scheduled by the FH-PDCCH 1010 as indicated by the arrow shown by reference number 1016. In some other aspects, the FH-PUSCH 1014 may be scheduled by the FH-PDSCH, as in FIG. 9. In some aspects, the relay node 510 may multiplex the indication 1002 regarding the first communication and the indication 1004 from the second wireless node 515 in the FH-PUSCH 1014 or the FH-PUCCH. This may be referred to as explicit multiplexing. In some other aspects, the relay node 510 may transmit the FH-PUSCH 1014 or the FH-PUCCH only if the relay node 510 successfully received the first communication, such as the FH-PDSCH 1012. This may be referred to as implicit multiplexing. Thus, the relay node 510 can provide an indication (whether implicit or explicit) of a result of receiving the first communication in association with the indication 1004 of whether the second wireless node 515 successfully received the second communication, which reduces signaling overhead relative to providing separate transmissions of indications of results of receiving the first communication and the second communication.

Figure 11A:
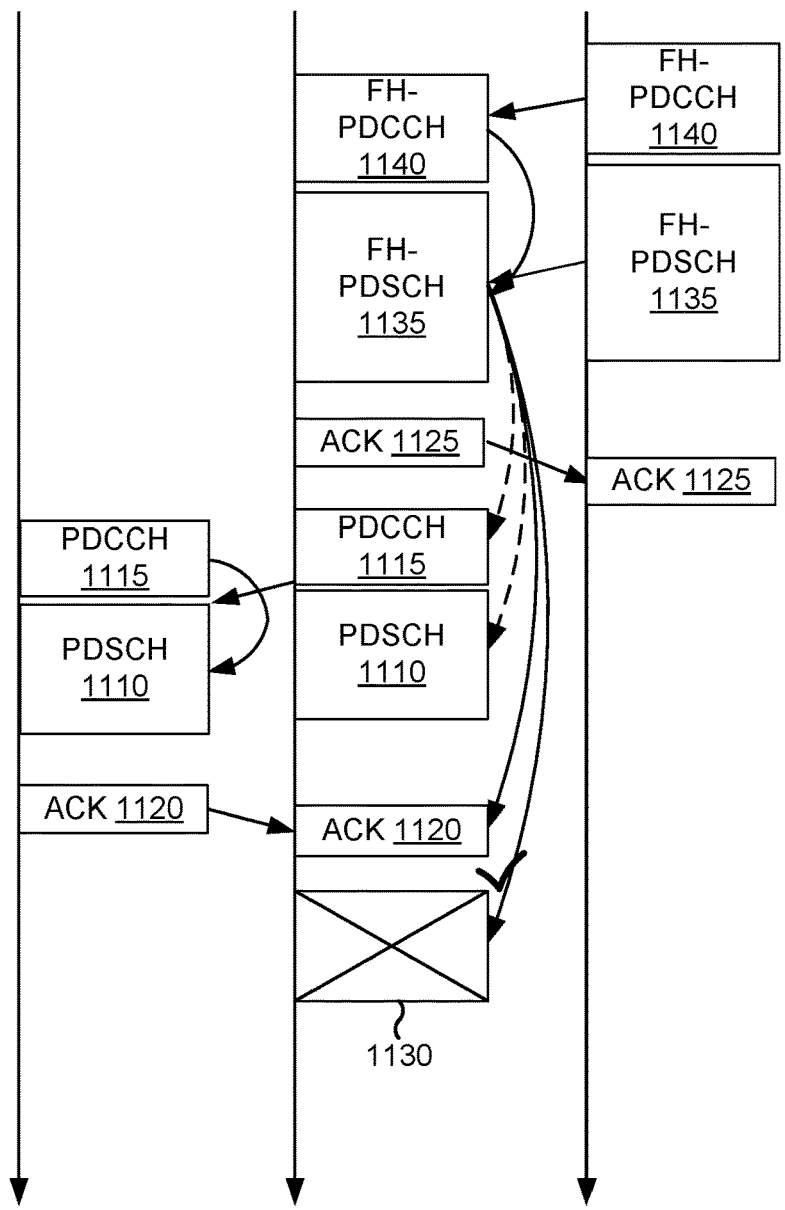
Figure 11B:
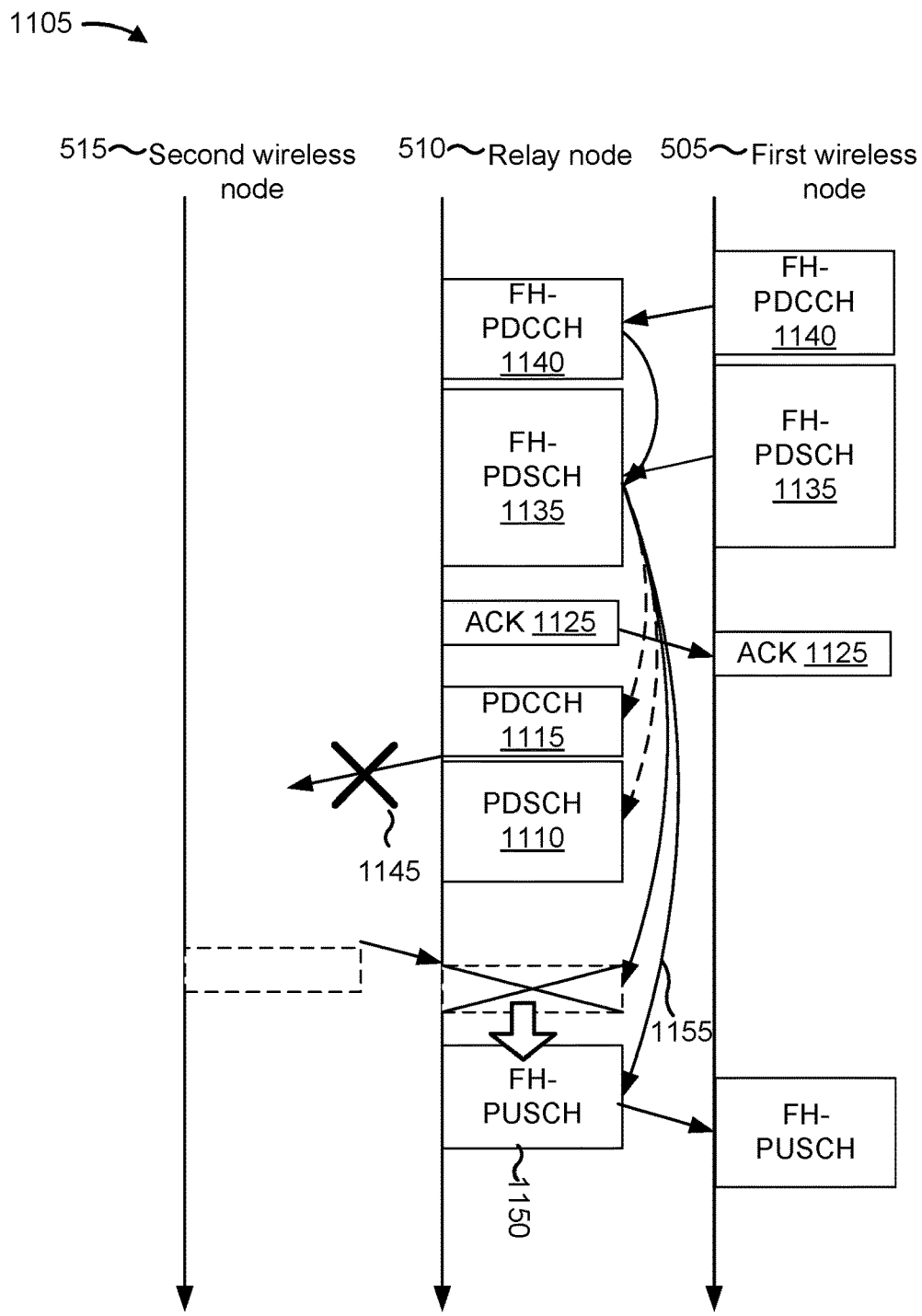

FIGS. 11A and 11B show examples 1100 and 1105 where the relay node 510 transmits the FH-PUSCH or FH-PUCCH only if the second wireless node 515 did not successfully receive the second communication (such as the PDSCH 1110 or the PDCCH 1115). In examples 1100 and 1105, the relay node 510 is capable of processing an indication 1120 of whether the second communication is successfully received. For example, the relay node 510 may provide capability information indicating that the relay node 510 is capable of processing such an indication 1120 and may be configured to process the indication 1120 accordingly. In FIG. 11A, the FH-PDCCH 1140 schedules the FH-PDSCH 1135. The FH-PDSCH 1135 carries information indicating the second communication (indicated by the dashed arrows to the PDCCH 1115 and the PDSCH 1110), as well as the indication 1120 and a resource for transmitting an FH-PUSCH or FH-PUCCH carrying the indication 1120 (if the indication 1120 is to be forwarded to the first wireless node 505), as described herein.

As shown, in some aspects, the relay node 510 may transmit feedback 1125 regarding the first communication (such as the FH-PDSCH 1135) to the first wireless node 505. For example, the feedback 1125 regarding the first communication may include an indication of whether the first communication was received. By providing the indication of whether the first communication was received, the relay node 510 enables the first wireless node 505 to determine, in the absence of an explicit indication of whether the second communication was received by the second wireless node 515, that the second communication was received. In some aspects, the relay node 510 may not transmit the feedback 1125 regarding the first communication, which may conserve communication resources in the case that the link between the first wireless node 505 and the relay node 510 is considered reliable.

FIG. 11A shows an example where the second wireless node 515 successfully receives the second communication, as indicated by the check mark next to the indication 1120 of whether the second communication was received. As shown by reference number 1130, if the indication indicates that the second communication was successfully received (that is, an ACK), the relay node 510 may not forward the indication 1120. For example, the relay node 510 may skip transmission of an FH-PUCCH or an FH-PUSCH configured by an FH-PDSCH 1135 or an FH-PDCCH 1140 of the first communication. If the DU does not receive an FH-PUCCH or FH-PUSCH from the relay node 510, the DU may determine that transmission of the second communication was successful. Thus, signaling resources of the relay node 510 and the first wireless node 505 are conserved, particularly in scenarios where the link between the relay node 510 and the second wireless node 515 is considered reliable, and in scenarios where the second wireless node 515 is another relay node 510.

FIG. 11B shows an example where the second wireless node 515 fails to receive the second communication, as indicated by the "X" 1145 between the second communication and the second wireless node 515. As shown by reference number 1150, in some aspects, the relay node 510 may provide an FH-PUCCH or an FH-PUSCH, configured by an FH-PDSCH 1135 or an FH-PDCCH 1140 of the first communication (in example 1105, by the FH-PDSCH 1135, as indicated by the arrow 1155), if the second communication fails. For example, in some aspects, the relay node 510 may provide the FH-PUCCH or the FH-PUSCH if the relay node 510 receives a NACK from the second wireless node 515. As another example, in some aspects, the relay node 510 may provide the FH-PUCCH or the FH-PUSCH if the relay node 510 does not detect an indication from the second wireless node 515. If the first wireless node 505 receives an FH-PUCCH or FH-PUSCH from the relay node 510 (such as if the FH-PUCCH or the FH-PUSCH indicates a NACK for the second communication as forwarded from the second wireless node 515, or if the FH-PUCCH or the FH-PUSCH indicates that the relay node 510 did not receive an indication regarding the second communication), the first wireless node 505 may determine that transmission of the second communication was unsuccessful. In some aspects, the first wireless node 505 may instruct the relay node 510 to retransmit the second communication if the first wireless node 505 receives the FH-PUCCH or the FH-PUSCH.

In some aspects, the relay node 510 may not transmit a third communication to the first wireless node 505. For example, the relay node 510 may be configured to retransmit the second communication (such as the PDCCH 1115 or the PDSCH 1110) if the relay node 510 receives a NACK regarding the second communication or does not receive an indication regarding the second communication. In this case, the relay node 510 may retransmit the second communication based on receiving the NACK or not receiving the indication, which conserves signal resources of the first wireless node 505.

Figure 12:
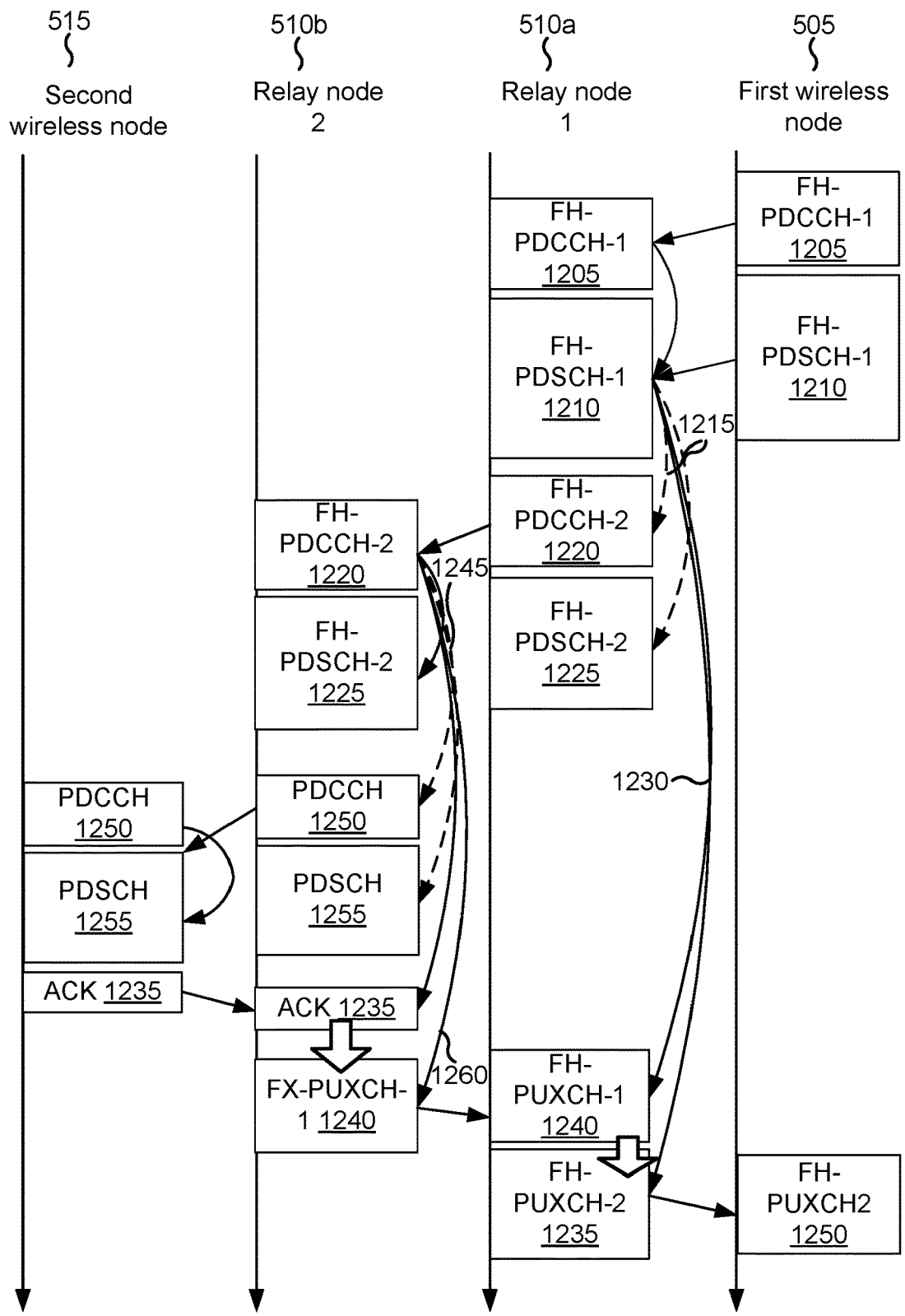

FIG. 12 shows an example 1200 of multi-hop relaying in accordance with the techniques described herein. The example 1200 includes a first relay node 510a and a second relay node 510b. As shown by reference number 1205, the first relay node 510a may receive a first communication (FH-PDCCH-1 1205 and FH-PDSCH-1 1210) from the first wireless node 505. As shown by the dashed arrows 1215, the first communication may schedule a second communication (FH-PDCCH2 1220 and FH-PDSCH2 1225) by the first relay node 510a. Furthermore, as indicated by the solid arrows 1230, the first communication may schedule a resource or provide a configuration for a third communication by the first relay node 510a (that is, FH-PUCCH-2 or FH-PUSCH-2, represented by FH-PUXCH-2 1235) and for a third communication by the second relay node 510b (that is, FH-PUCCH-1 or FH-PUSCH-1, represented by FH-PUXCH-1 1240). As shown, the first relay node 510a may transmit the second communication to the second relay node 510b. As further shown by the dashed arrows indicated by reference number 1245, the second communication transmitted by the first relay node 510a (that is, FH-PDCCH-2 1220 or FH-PDSCH-2 1225) may schedule a second transmission by the second relay node 510b (a PDCCH 1250 and a PDSCH 1255 destined for the second wireless node 515). As indicated by the solid arrow indicated by reference number 1260, the second communication may schedule a resource or provide a configuration for a third communication by the second relay node 510 (that is, FH-PUCCH-1 or FH-PUSCH-1, represented by FH-PUXCH-1 1240). In some aspects, the first communication may carry configurations for both of the second communications and both of the third communications. In some other aspects, the first relay node 510a may generate a configuration for one or more of the second relay node 510b's second communication and third communication.

As shown, in example 1200, the first relay node 510a and the second relay node 510b do not transmit explicit (such as dynamic) feedback regarding the first communication or the second communication transmitted by the first relay node 510. For example, the first relay node 510a and the second relay node 510b may defer feedback such that a single, end-to-end acknowledgment is provided for the payload. In some aspects, one or more of the first relay node 510a and the second relay node 510b may retransmit a second communication based on determining that the second communication was not received by a downstream node. For example, the first relay node 510a or the second relay node 510b may retransmit the second communication autonomously (that is, without receiving an instruction from the first wireless node 505). As another example, the first relay node 510a or the second relay node 510b may retransmit the second communication based on an instruction from the first wireless node 505, or from an upstream node (for example, the second relay node 510b may retransmit the second communication based on an instruction from the first relay node 510a).

In some aspects, one or more of the first relay node 510a and the second relay node 510b may apply the techniques of example 800 of FIG. 8 (in which transmission of the feedback is skipped). In some other aspects, one or more of the first relay node 510a and the second relay node 510b may apply the techniques of example 900 of FIG. 9 (in which the FH-PDSCH-1 1210 or the FH-PDSCH-2 1225 carry the control information for the third communications), which enables the first relay node 510a or the first wireless node 505 to determine whether the first communication and the respective second communications were received. In yet other aspects, one or more of the first relay node 510a or the second relay node 510b may apply the techniques of example 1000 and may explicitly or implicitly multiplex feedback regarding the first communication or the second communication with an indication of whether the second wireless node 515 successfully received the payload. In still other aspects, one or more of the first relay node 510a or the second relay node 510b may apply the techniques of example 1100 and may provide feedback only if the second wireless node 515 fails to receive the second communication. In this way, the techniques described in FIGS. 8, 9, 10, 11A, and 11B can be applied for multi-hop networks.

In some aspects, a relay node may provide early feedback. Early feedback may include an ACK/NACK regarding a first communication or a second communication. For example, the relay node may provide the early feedback in accordance with a baseline feedback timeline, such as prior to transmitting the third communication. Providing early feedback may reduce latency if a hop on a multi-hop relay fails. In some aspects, an upstream node may defer relaying feedback received from a downstream node. For example, if the first relay node receives feedback from a second relay node, the first relay node may defer relaying the feedback, such as until the indication of whether the second communication was received by the second wireless node is relayed. In this way, relay nodes can autonomously perform retransmission of failed communications based on early feedback without triggering end-to-end retransmission of the first communication.

Figure 13:
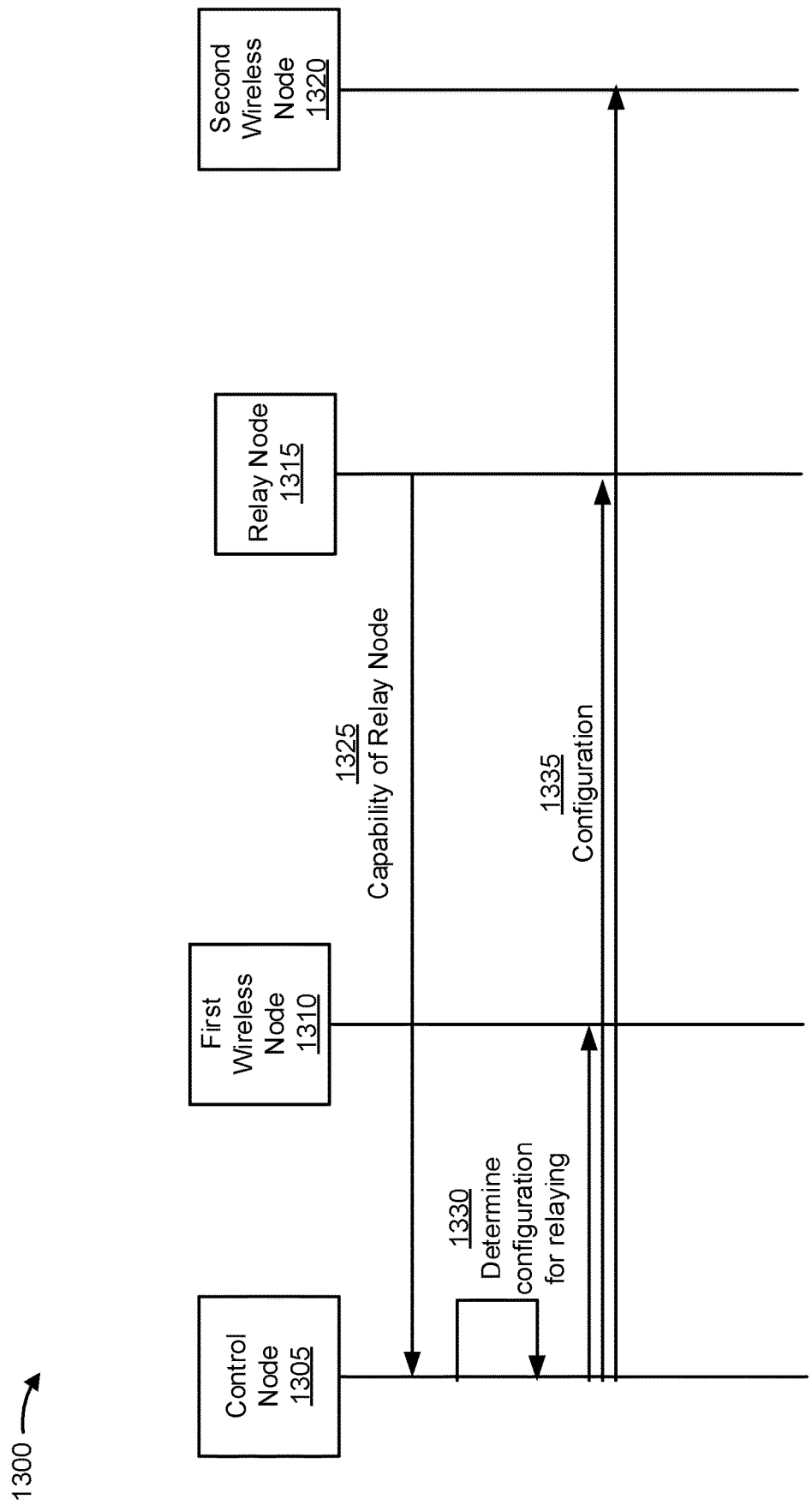
FIG. 13 is a diagram illustrating an example of configuration signaling associated with efficient acknowledgment by a relay node for a relaying operation.

FIG. 13 is a diagram illustrating an example 1300 of configuration signaling associated with efficient acknowledgment by a relay node for a relaying operation. As shown, example 1300 includes a control node 1305, a first wireless node 1310, a relay node 1315, and a second wireless node 1320. In some aspects, the control node 1305 may be a base station 110, a CU of an IAB donor such as IAB-donor 405, a DU of an IAB node such as IAB node 410, or an IAB node such as IAB node 410. In some aspects, the first wireless node 1310 may be a base station 110, a UE 120, an IAB donor such as IAB-donor 405, an IAB node such as IAB node 410, or another relay node 1315. In some aspects, the relay node 1315 may be a relay device, a remote unit of an IAB node, a relay station, a Layer 1 relay device, a millimeter wave relay device, a base station 110, a UE 120, an RU node 425, a relay node 510, or an IAB node such as IAB node 410. In some aspects, the second wireless node 1320 may be a base station 110, a UE 120, an IAB donor such as IAB-donor 405, an RU node 425, a relay node 510, an IAB node such as IAB node 410, or another relay node 1315. In some aspects, the second wireless node 1320 may be a device for which a relayed communication is destined. In some other aspects, the second wireless node 1320 may be a next relay node, after the relay node 1315, in a path of the relayed communication. Operations described as performed by the control node 1305 may be performed by a communication device of the control node 1305. Operations described as performed by the first wireless node 1310 may be performed by a communication device of the first wireless node 1310. Operations described as performed by the relay node 1315 may be performed by a communication device of the relay node 1315. Operations described as performed by the second wireless node 1320 may be performed by a communication device of the second wireless node 1320.

As shown by reference number 1325, the relay node 1315 may transmit, to the control node 1305, capability information indicating a capability of the relay node 1315. In some aspects, the information indicating the capability may indicate whether the relay node 1315 can process an ACK or negative ACK/NACK from a second wireless node 1320. "Processing an ACK/NACK" may refer to decoding the ACK/NACK (such as a codeword of the ACK/NACK) or to making a decision regarding whether the ACK/NACK is an ACK or a NACK (such as based on a DMRS RSRP associated with the ACK/NACK). If the relay node 1315 can process the ACK/NACK from the second wireless node 1320, then the relay node 1315 can determine whether retransmission of a second communication is needed, which may enable the relay node 1315 to autonomously retransmit a second communication without reporting an ACK/NACK for the second communication. In some aspects, the control node 1305 may receive information indicating capabilities of the first wireless node 1310 or the second wireless node 1320.

In some aspects, the capability may indicate one or more relaying operations supported by the relay node 1315 (such as a duplexing capability of the relay node 1315 or a buffer capability of the relay node 1315), one or more digital processing operations supported by the relay node 1315 (as described in more detail with respect to FIGS. 7A and 7B), beamforming codebook information associated with a beamforming codebook stored by the relay node 1315 (such as indicating one or more transmit beams, one or more receive beams, spatial quasi co-location information associated with the beams, a number of antenna arrays of the relay node 1315, a number of antenna panels of the relay node 1315, an indication of which beams are associated with which antenna arrays or antenna panels, and so on), a beamforming configuration capability of the relay node 1315 (such as indicating if beamforming parameters, such as a phase setting or an amplitude setting of the relay node 1315 can be dynamically configured by the control node 1305), a transmit power configuration of the relay node 1315 (such as indicating a power headroom of the relay node 1315, a maximum transmit power supported by the relay node 1315, a maximum gain level supported by the relay node 1315, a current gain setting of the relay node 1315, a current transmit power setting of the relay node 1315, and so on), a buffer status of the relay node 1315 (such as indicating an available memory of the buffer of the relay node 1315, a maximum buffer size, a buffer overflow indication, and so on), a conversion configuration associated with converting between analog signals and digital signals (such as an analog-to-digital conversion setting or a digital-to-analog conversion setting), an IQ sample compression capability of the relay node 1315, or similar examples.

As shown by reference number 1330, the control node 1305 may determine a configuration for relaying associated with the first wireless node 1310, the relay node 1315, and the second wireless node 1320. As shown by reference number 1335, the control node 1305 may provide the configuration for relaying to one or more of the first wireless node 1310, the relay node 1315, and the second wireless node 1320. For example, in some aspects, the control node 1305 may control operations of one or more of the first wireless node 1310, the relay node 1315, or the second wireless node 1320 for a relaying operation. In some other aspects, the control node 1305 may configure one or more of the first wireless node 1310, the relay node 1315, or the second wireless node 1320 to perform the relaying operation.

In some aspects, the configuration may indicate resources for a relaying operation, such as resources used to transmit a first communication, a second communication, feedback regarding a first communication or a second communication, or a third communication. Additionally or alternatively, the configuration may indicate a transmission configuration for one or more of the communications, such as a demodulation reference signal configuration, a redundancy version, a modulation order, a layer mapping configuration, a precoder, a digital beamforming configuration, a resource element mapping configuration (that is, a resource allocation configuration), a subcarrier spacing, a cyclic prefix, or an analog transmit beam. For example, in some aspects, the control node 1305 may configure and control one or more of the operations described with regard to FIGS. 8-12.

Figure 14:
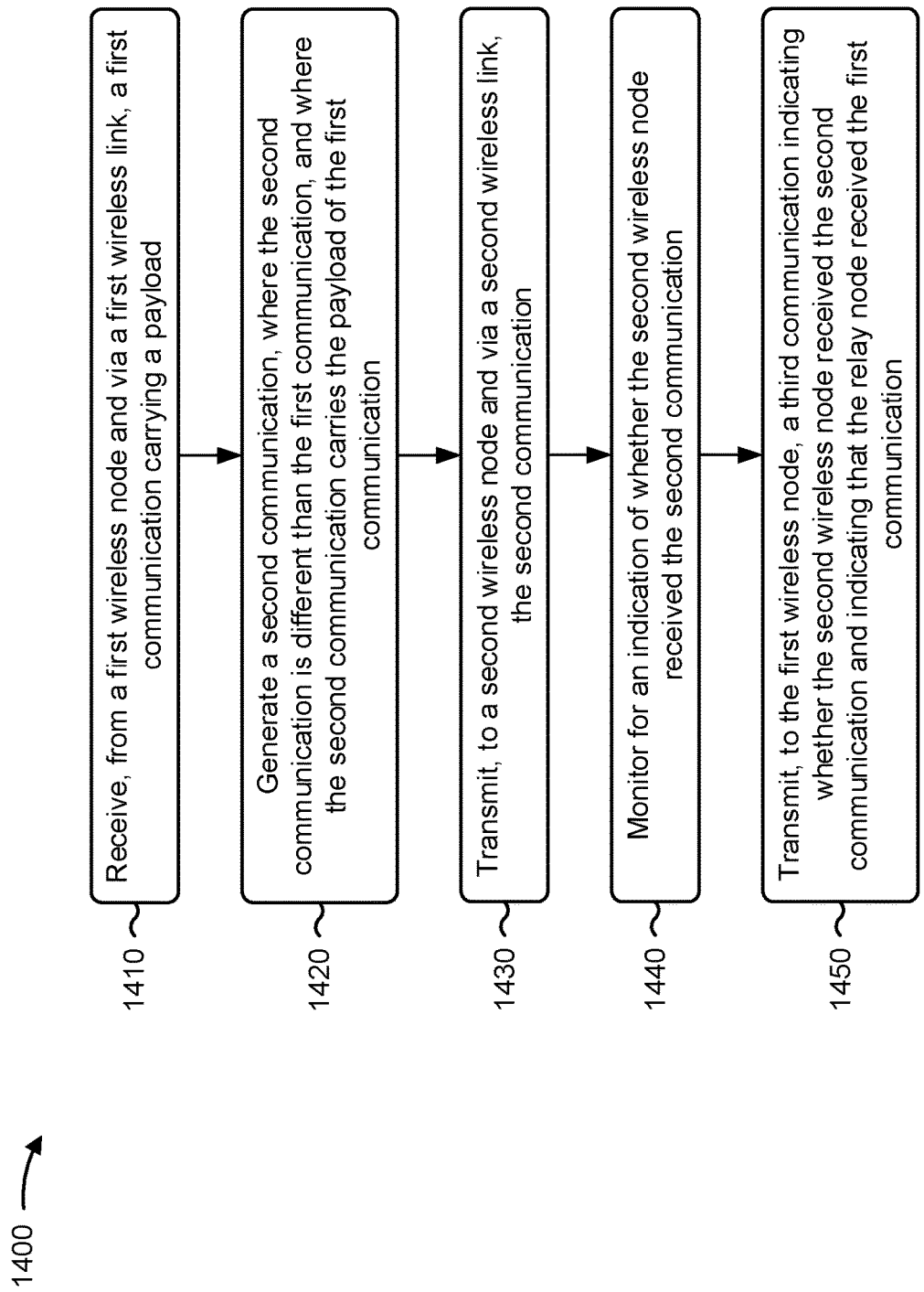
FIGS. 14-16 are diagrams illustrating example processes for efficient feedback by a relay node.

FIG. 14 is a diagram illustrating an example process 1400 performed, for example, by a communication device of a relay node. The process 1400 is an example where the communication device of the relay node (for example, the BS 110 or the UE 120 of FIG. 1, the IAB node 410 or the RU node 425 of FIG. 4, or the relay node 510 or the second wireless node 515 of FIG. 5) performs operations associated with efficient acknowledgment by a relay node.

As shown in FIG. 14, in some aspects, the process 1400 may include receiving, from a first wireless node and via a first wireless link, a first communication carrying a payload (block 1410). For example, the communication device (such as by using reception component 1702, depicted in FIG. 17) may receive, from a first wireless node and via a first wireless link, a first communication carrying a payload.

As further shown in FIG. 14, in some aspects, the process 1400 may include generating a second communication, where the second communication is different than the first communication, and where the second communication carries the payload of the first communication (block 1420). For example, the communication device (such as by using relaying component 1708, depicted in FIG. 17) may generate a second communication, where the second communication is different than the first communication, and where the second communication carries the payload of the first communication. In some aspects, the communication device may generate the second communication using digital processing.

As further shown in FIG. 14, in some aspects, the process 1400 may include transmitting, to a second wireless node and via a second wireless link, the second communication (block 1430). For example, the communication device (such as by using transmission component 1704, depicted in FIG. 17) may transmit, to a second wireless node and via a second wireless link, the second communication.

As further shown in FIG. 14, in some aspects, the process 1400 may include monitoring for an indication of whether the second wireless node received the second communication (block 1440). For example, the communication device (such as by using monitoring component 1710, depicted in FIG. 17) may monitor for an indication of whether the second wireless node received the second communication.

As further shown in FIG. 14, in some aspects, the process 1400 may include transmitting, to the first wireless node, a third communication indicating whether the second wireless node received the second communication and indicating that the relay node received the first communication (block 1450). For example, the communication device (such as by using transmission component 1704, depicted in FIG. 17) may transmit, to the first wireless node, a third communication indicating whether the second wireless node received the second communication and indicating that the relay node received the first communication.

The process 1400 may include additional aspects, such as any single aspect or any combination of aspects described in connection with the process 1400 or in connection with one or more other processes described elsewhere herein.

In a first additional aspect, the first communication includes a shared channel, and the shared channel includes the payload and a control channel carrying control information for the second communication.

In a second additional aspect, alone or in combination with the first aspect, transmitting the third communication further includes forwarding the indication of whether the second wireless node received the second communication.

In a third additional aspect, alone or in combination with one or more of the first and second aspects, the first communication includes a shared channel that carries control information for forwarding the indication.

In a fourth additional aspect, alone or in combination with one or more of the first through third aspects, the control information indicates a resource for the third communication or a configuration for the third communication.

In a fifth additional aspect, alone or in combination with one or more of the first through fourth aspects, the third communication carries the indication of whether the second wireless node received the second communication and an explicit indication of whether the first wireless node successfully received the first communication.

In a sixth additional aspect, alone or in combination with one or more of the first through fifth aspects, the indication of whether the second wireless node received the second communication and the explicit indication are multiplexed in a shared channel of the third communication.

In a seventh additional aspect, alone or in combination with one or more of the first through sixth aspects, transmission of the third communication indicates that the relay node successfully received the first communication.

In an eighth additional aspect, alone or in combination with one or more of the first through seventh aspects, the third communication is transmitted only if the second wireless node did not successfully receive the second communication.

In a ninth additional aspect, alone or in combination with one or more of the first through eighth aspects, the process 1400 includes determining that the second wireless node did not successfully receive the second communication based on the indication or based on failing to receive the indication.

In a tenth additional aspect, alone or in combination with one or more of the first through ninth aspects, the process 1400 includes receiving an instruction to retransmit the second communication based on the second wireless node failing to receive the second communication.

In an eleventh additional aspect, alone or in combination with one or more of the first through tenth aspects, the process 1400 includes retransmitting the second communication based on the second wireless node failing to receive the second communication.

In a twelfth additional aspect, alone or in combination with one or more of the first through eleventh aspects, the relay node is a first relay node, the second wireless node is a second relay node, the payload is destined for a third wireless node, and the method further includes transmitting, to the first wireless node prior to transmitting the third communication, an indication of whether the first communication was received.

In a thirteenth additional aspect, alone or in combination with one or more of the first through twelfth aspects, the relay node is a first relay node, the second wireless node is a second relay node, the payload is destined for a third wireless node, and the method further includes storing the indication of whether the second wireless node received the second communication, where the third communication includes an indication of whether the third wireless node successfully received the payload.

Although FIG. 14 shows example blocks of the process 1400, in some aspects, the process 1400 may include additional blocks, fewer blocks, different blocks, or differently arranged blocks than those depicted in FIG. 14. Additionally, or alternatively, two or more of the blocks of the process 1400 may be performed in parallel.

Figure 15:
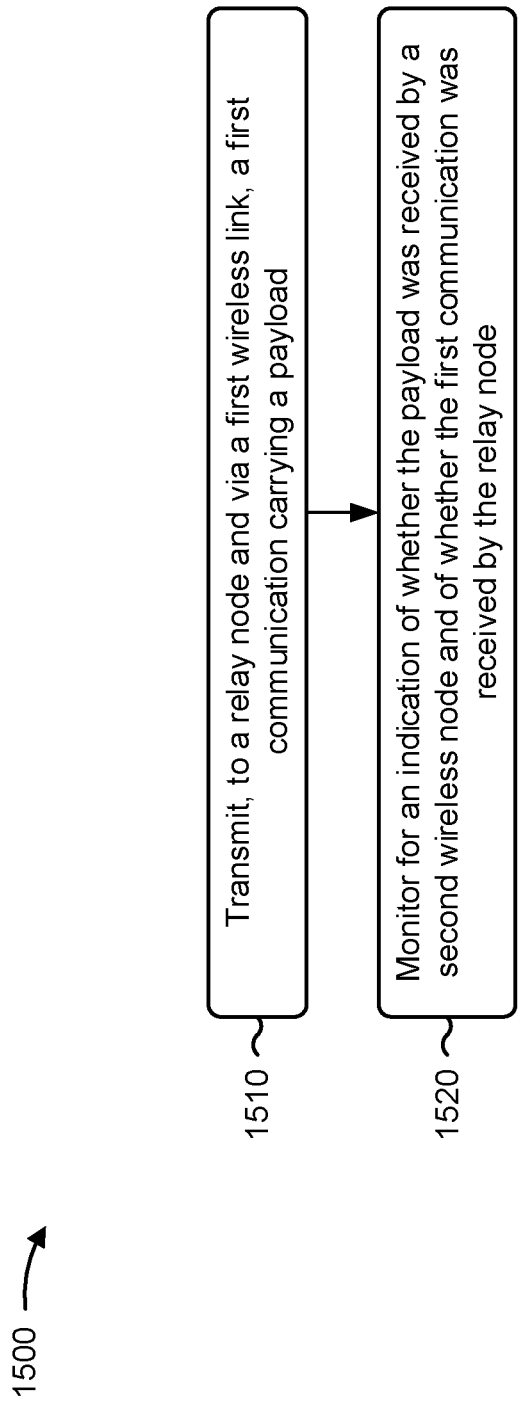

FIG. 15 is a diagram illustrating an example process 1500 performed, for example, by a communication device of a first wireless node. The process 1500 is an example where the communication device of the first wireless node (for example, the BS 110 or the UE 120 of FIG. 1, the anchor base station 335 or the non-anchor base station 345 of FIG. 3, the IAB-donor 405 or the IAB node 410 of FIG. 4, or the first wireless node 505 of FIG. 5) performs operations associated with efficient acknowledgment by a relay node.

As shown in FIG. 15, in some aspects, the process 1500 may include transmitting, to a relay node and via a first wireless link, a first communication carrying a payload (block 1510). For example, the communication device (such as by using transmission component 1804, depicted in FIG. 18) may transmit, to a relay node and via a first wireless link, a first communication carrying a payload.

As further shown in FIG. 15, in some aspects, the process 1500 may include monitoring for an indication of whether the payload was received by a second wireless node and of whether the first communication was received by the relay node (block 1520). For example, the communication device (such as by using monitoring component 1808, depicted in FIG. 18) may monitor for an indication of whether the payload was received by a second wireless node and of whether the first communication was received by the relay node.

The process 1500 may include additional aspects, such as any single aspect or any combination of aspects described in connection with the process 1500 or in connection with one or more other processes described elsewhere herein.

In a first additional aspect, the process 1500 includes receiving the indication of whether the payload was received by the second wireless node, where the indication includes a negative acknowledgment for the payload, and where reception of the indication indicates whether the first communication was received by the relay node.

In a second additional aspect, alone or in combination with the first aspect, the first communication includes a shared channel, and the shared channel includes the payload and a control channel carrying control information for the indication.

In a third additional aspect, alone or in combination with one or more of the first and second aspects, the process 1500 includes triggering retransmission of a second communication carrying the payload by the relay node.

In a fourth additional aspect, alone or in combination with one or more of the first through third aspects, the process 1500 includes failing to receive the indication of whether the payload was received by the second wireless node, where the failure to receive the indication indicates that the first communication was not successfully received by the relay node.

In a fifth additional aspect, alone or in combination with one or more of the first through fourth aspects, the process 1500 includes retransmitting the first communication.

In a sixth additional aspect, alone or in combination with one or more of the first through fifth aspects, the indication is associated with a failure to decode feedback indicating whether the payload was received by the second wireless node, and the method further includes retransmitting the first communication.

In a seventh additional aspect, alone or in combination with one or more of the first through sixth aspects, the first communication includes a shared channel carrying the payload and control information for forwarding the indication.

In an eighth additional aspect, alone or in combination with one or more of the first through seventh aspects, the control information indicates a resource forwarding the indication or a configuration for forwarding the indication.

In a ninth additional aspect, alone or in combination with one or more of the first through eighth aspects, reception of the indication indicates that the shared channel was received by the relay node.

In a tenth additional aspect, alone or in combination with one or more of the first through ninth aspects, the indication includes an explicit indication of whether the relay node successfully received the first communication.

In an eleventh additional aspect, alone or in combination with one or more of the first through tenth aspects, the indication of whether the payload was received by the second wireless node and the explicit indication are multiplexed in an uplink channel.

In a twelfth additional aspect, alone or in combination with one or more of the first through eleventh aspects, failing to receive the indication indicates that the payload was received by the second wireless node.

In a thirteenth additional aspect, alone or in combination with one or more of the first through twelfth aspects, the process 1500 includes receiving the indication of whether the payload was received by the second wireless node, where the indication includes a negative acknowledgment for the payload, and where performing the communication further includes triggering a retransmission of the payload to the second wireless node.

In a fourteenth additional aspect, alone or in combination with one or more of the first through thirteenth aspects, the indication indicates whether each wireless node on a path between the first wireless node and the second wireless node received a communication associated with relaying the payload to the second wireless node.

In a fifteenth additional aspect, alone or in combination with one or more of the first through fourteenth aspects, the process 1500 includes triggering, based on the indication, a retransmission of a particular communication associated with a wireless node, of each wireless node on the path, that failed to receive the particular communication.

Although FIG. 15 shows example blocks of the process 1500, in some aspects, the process 1500 may include additional blocks, fewer blocks, different blocks, or differently arranged blocks than those depicted in FIG. 15. Additionally, or alternatively, two or more of the blocks of the process 1500 may be performed in parallel.

Figure 16:
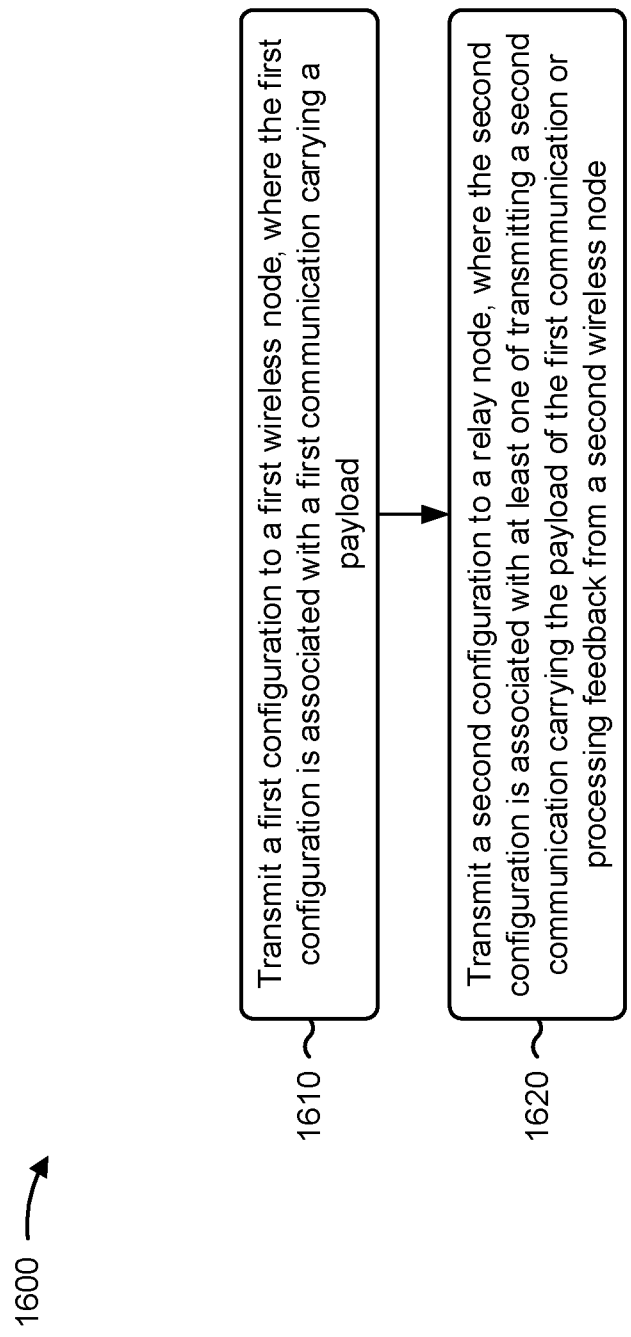

FIG. 16 is a diagram illustrating an example process 1600 performed, for example, by a communication device of a control node. The process 1600 is an example where the communication device of the control node (for example, the BS 110 of FIG. 1, the anchor base station 335 of FIG. 3, the IAB-donor 405 of FIG. 4, or the first wireless node of FIG. 5) performs operations associated with efficient acknowledgment by a relay node.

As shown in FIG. 16, in some aspects, the process 1600 may include transmitting a first configuration to a first wireless node, where the first configuration is associated with a first communication carrying a payload (block 1610). For example, the communication device (such as by using configuration component 1908, depicted in FIG. 19) may transmit a first configuration to a first wireless node, where the first configuration is associated with a first communication carrying a payload.

As further shown in FIG. 16, in some aspects, the process 1600 may include transmitting a second configuration to a relay node, where the second configuration is associated with at least one of transmitting a second communication carrying the payload of the first communication or processing feedback from a second wireless node (block 1620). For example, the communication device (such as by using configuration component 1908, depicted in FIG. 19) may transmit a second configuration to a relay node, where the second configuration is associated with at least one of transmitting a second communication carrying the payload of the first communication or processing feedback from a second wireless node.

The process 1600 may include additional aspects, such as any single aspect or any combination of aspects described in connection with the process 1600 or in connection with one or more other processes described elsewhere herein.

In a first additional aspect, the second configuration indicates to defer or skip transmission of feedback regarding the first communication.

In a second additional aspect, alone or in combination with the first aspect, the second configuration indicates to provide feedback regarding the first communication in association with an indication of whether the second wireless node received the second communication.

In a third additional aspect, alone or in combination with one or more of the first and second aspects, the feedback regarding the first communication is implicit in association with the indication of whether the second wireless node received the second communication.

In a fourth additional aspect, alone or in combination with one or more of the first through third aspects, the feedback regarding the first communication is explicitly provided with the indication of whether the second wireless node received the second communication.

Although FIG. 16 shows example blocks of the process 1600, in some aspects, the process 1600 may include additional blocks, fewer blocks, different blocks, or differently arranged blocks than those depicted in FIG. 16. Additionally, or alternatively, two or more of the blocks of the process 1600 may be performed in parallel.

Figure 17:
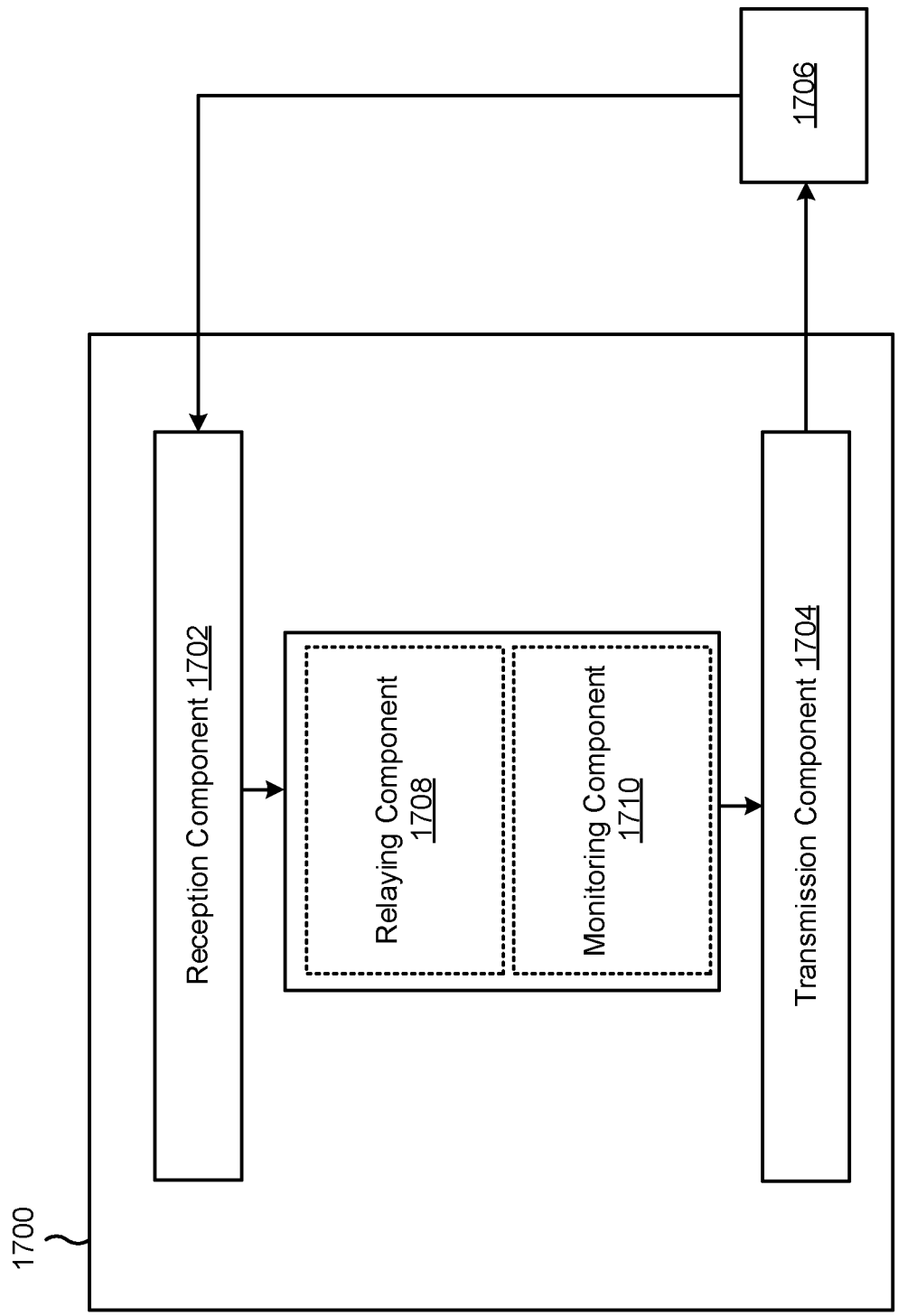

FIG. 17 is a block diagram of an example apparatus 1700 for wireless communication. The apparatus 1700 may be a relay node, or a relay node may include the apparatus 1700. In some aspects, the apparatus 1700 includes a reception component 1702 and a transmission component 1704, which may be in communication with one another (for example, via one or more buses or one or more other components). As shown, the apparatus 1700 may communicate with another apparatus 1706 (such as a UE, a base station, or another wireless communication device) using the reception component 1702 and the transmission component 1704. As further shown, the apparatus 1700 may include one or more of a relaying component 1708 or a monitoring component 1710, among other examples.

In some aspects, the apparatus 1700 may be configured to perform one or more operations described herein in connection with FIGS. 5-13. Additionally, or alternatively, the apparatus 1700 may be configured to perform one or more processes described herein, such as the process 1400 of FIG. 14, or a combination thereof. In some aspects, the apparatus 1700 or one or more components shown in FIG. 17 may include one or more components of the relay node described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1706. In some aspects, the reception component 1702 may include one or more antennas, a demodulator, a MIMO detector, a receive processor, a controller/processor, a memory, or a combination thereof, of the relay node described in connection with FIG. 2.

The transmission component 1704 may transmit communications, such as reference signals, control information, data communications, or a combination thereof, to the apparatus 1706. In some aspects, one or more other components of the apparatus 1706 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modulator, a transmit MIMO processor, a transmit processor, a controller/processor, a memory, or a combination thereof, of the relay node described in connection with FIG. 2. In some aspects, the transmission component 1704 may be co-located with the reception component 1702 in a transceiver.

The reception component 1702 may receive, from a first wireless node and via a first wireless link, a first communication carrying a payload. The relaying component 1708 may generate a second communication, where the second communication is different than the first communication, and where the second communication carries the payload of the first communication. The transmission component 1704 may transmit, to a second wireless node and via a second wireless link, the second communication. The monitoring component 1710 may monitor for an indication of whether the second wireless node received the second communication. The transmission component 1704 may transmit, to the first wireless node, a third communication indicating whether the second wireless node received the second communication and indicating that the relay node received the first communication.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

Figure 18:
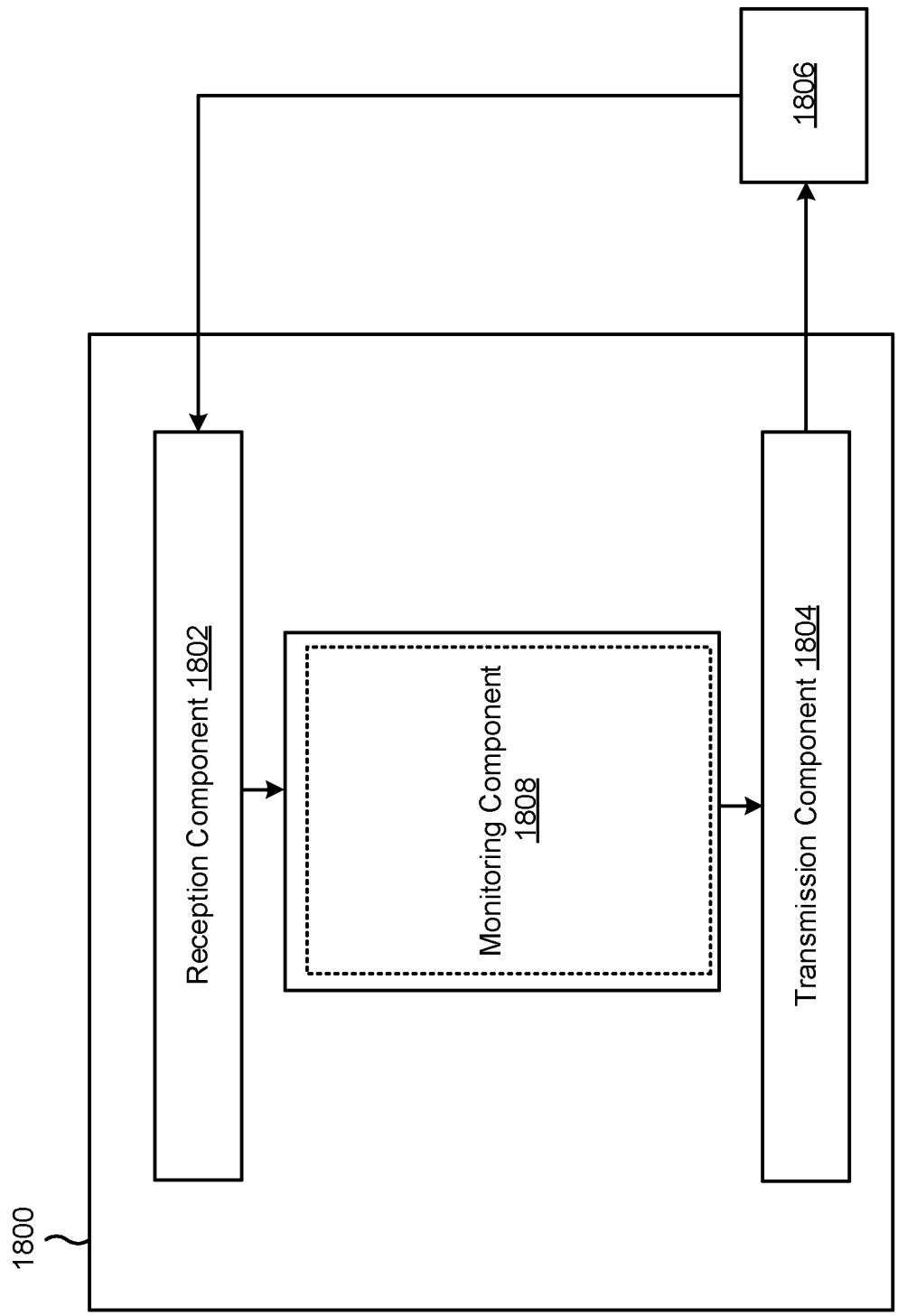

FIG. 18 is a block diagram of an example apparatus 1800 for wireless communication. The apparatus 1800 may be a first wireless node, or a first wireless node may include the apparatus 1800. In some aspects, the apparatus 1800 includes a reception component 1802 and a transmission component 1804, which may be in communication with one another (for example, via one or more buses or one or more other components). As shown, the apparatus 1800 may communicate with another apparatus 1806 (such as a UE, a base station, or another wireless communication device) using the reception component 1802 and the transmission component 1804. As further shown, the apparatus 1800 may include a monitoring component 1808, among other examples.

In some aspects, the apparatus 1800 may be configured to perform one or more operations described herein in connection with FIGS. 5-13. Additionally, or alternatively, the apparatus 1800 may be configured to perform one or more processes described herein, such as process 1500 of FIG. 15, or a combination thereof. In some aspects, the apparatus 1800 or one or more components shown in FIG. 18 may include one or more components of the first wireless node described in connection with FIG. 2. Additionally, or alternatively, one or more components shown in FIG. 18 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1806. In some aspects, the reception component 1802 may include one or more antennas, a demodulator, a MIMO detector, a receive processor, a controller/processor, a memory, or a combination thereof, of the first wireless node described in connection with FIG. 2.

The transmission component 1804 may transmit communications, such as reference signals, control information, data communications, or a combination thereof, to the apparatus 1806. In some aspects, one or more other components of the apparatus 1806 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modulator, a transmit MIMO processor, a transmit processor, a controller/processor, a memory, or a combination thereof, of the first wireless node described in connection with FIG. 2. In some aspects, the transmission component 1804 may be co-located with the reception component 1802 in a transceiver.

The transmission component 1804 may transmit, to a relay node and via a first wireless link, a first communication carrying a payload. The monitoring component 1808 may monitor for an indication of whether the payload was received by a second wireless node and of whether the first communication was received by the relay node.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

FIG. 19 is a block diagram of an example apparatus 1900 for wireless communication. The apparatus 1900 may be a control node, or a control node may include the apparatus 1900. In some aspects, the apparatus 1900 includes a reception component 1902 and a transmission component 1904, which may be in communication with one another (for example, via one or more buses or one or more other components). As shown, the apparatus 1900 may communicate with another apparatus 1906 (such as a UE, a base station, or another wireless communication device) using the reception component 1902 and the transmission component 1904. As further shown, the apparatus 1900 may include a configuration component 1908, among other examples.

In some aspects, the apparatus 1900 may be configured to perform one or more operations described herein in connection with FIGS. 5-13. Additionally, or alternatively, the apparatus 1900 may be configured to perform one or more processes described herein, such as the process 1600 of FIG. 16, or a combination thereof. In some aspects, the apparatus 1900 or one or more components shown in FIG. 19 may include one or more components of the control node described in connection with FIG. 2. Additionally, or alternatively, one or more components shown in FIG. 19 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1902 may receive communications, such as reference signals, control information, data communications, or a combination thereof, from the apparatus 1906. The reception component 1902 may provide received communications to one or more other components of the apparatus 1900. In some aspects, the reception component 1902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1906. In some aspects, the reception component 1902 may include one or more antennas, a demodulator, a MIMO detector, a receive processor, a controller/processor, a memory, or a combination thereof, of the control node described in connection with FIG. 2.

The transmission component 1904 may transmit communications, such as reference signals, control information, data communications, or a combination thereof, to the apparatus 1906. In some aspects, one or more other components of the apparatus 1906 may generate communications and may provide the generated communications to the transmission component 1904 for transmission to the apparatus 1906. In some aspects, the transmission component 1904 may perform signal processing on the generated communications (such as filtering, amplification, modulation, digital-to-analog conversion, multiplexing, interleaving, mapping, or encoding, among other examples), and may transmit the processed signals to the apparatus 1906. In some aspects, the transmission component 1904 may include one or more antennas, a modulator, a transmit MIMO processor, a transmit processor, a controller/processor, a memory, or a combination thereof, of the control node described in connection with FIG. 2. In some aspects, the transmission component 1904 may be co-located with the reception component 1902 in a transceiver.

The transmission component 1904 or the configuration component 1908 may transmit a first configuration to a first wireless node, where the first configuration is associated with a first communication carrying a payload. The transmission component 1904 or the configuration component 1908 may transmit a second configuration to a relay node, where the second configuration is associated with at least one of transmitting a second communication carrying the payload of the first communication or processing feedback from a second wireless node.

The number and arrangement of components shown in FIG. 19 are provided as an example. In practice, there may be additional components, fewer components, different components, or differently arranged components than those shown in FIG. 19. Furthermore, two or more components shown in FIG. 19 may be implemented within a single component, or a single component shown in FIG. 19 may be implemented as multiple, distributed components. Additionally, or alternatively, a set of (one or more) components shown in FIG. 19 may perform one or more functions described as being performed by another set of components shown in FIG. 19.

The foregoing disclosure provides illustration and description, but is not intended to be exhaustive or to limit the aspects to the precise forms disclosed. Modifications and variations may be made in light of the disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, satisfying a threshold may refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a-b, a-c, b-c, and a-b-c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms. Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described herein should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A communication device of a relay node for wireless communication, comprising:
   a first interface configured to obtain, from a first wireless node and via a first wireless link, a first communication carrying a payload;
   a processing system configured to generate, using digital processing, a second communication, wherein the second communication is different than the first communication, and wherein the second communication carries the payload of the first communication;
   the first interface or a second interface configured to output, to a second wireless node and via a second wireless link, the second communication;
   the processing system configured to monitor for an indication of whether the second wireless node received the second communication;
   the first interface or the second interface configured to output, to the first wireless node, a third communication that includes:
      a first feedback indication of whether the second wireless node received the second communication, and
      a second feedback indication that the relay node received the first communication;
   wherein the first interface or the second interface, to output the third communication, is configured to:
      forward the indication of whether the second wireless node received the second communication;
   wherein the first communication includes a shared channel that carries control information for forwarding the indication; and
   wherein the control information indicates a resource for the third communication or a configuration for the third communication.

2. The communication device of claim 1, wherein the shared channel includes the payload and a control channel carrying control information for the second communication.

3. The communication device of claim 1, wherein the third communication carries the first feedback indication of whether the second wireless node received the second communication and an explicit indication of whether the first wireless node successfully received the first communication, the second feedback indication comprising the explicit indication.

4. The communication device of claim 3, wherein the first feedback indication of whether the second wireless node received the second communication and the explicit indication are multiplexed in a shared channel of the third communication.

5. The communication device of claim 1, wherein transmission of the third communication indicates that the relay node successfully received the first communication.

6. The communication device of claim 1, wherein the third communication is transmitted only if the second wireless node did not successfully receive the second communication.

7. The communication device of claim 6, wherein the processing system is further configured to:
   determine that the second wireless node did not successfully receive the second communication based on the indication or based on failing to receive the indication.

8. The communication device of claim 1, wherein the first interface or the second interface is further configured to:

obtain an instruction to retransmit the second communication based on the second wireless node failing to receive the second communication.

9. The communication device of claim 1, wherein the first interface or the second interface is further configured to:
retransmit the second communication based on the second wireless node failing to receive the second communication.

10. The communication device of claim 1, wherein the relay node is a first relay node, the second wireless node is a second relay node, and the payload is destined for a third wireless node, and wherein the first interface or the second interface is further configured to:
output, to the first wireless node prior to transmitting the third communication, an indication of whether the first communication was received.

11. The communication device of claim 1, wherein the relay node is a first relay node, the second wireless node is a second relay node, and the payload is destined for a third wireless node, and wherein the processing system is configured to:
store the indication of whether the second wireless node received the second communication, wherein the third communication includes a third feedback indication of whether the third wireless node successfully received the payload.

12. A communication device of a first wireless node for wireless communication, comprising:
a first interface configured to output, to a relay node and via a first wireless link, a first communication carrying a payload;
a processing system configured to monitor for a second communication that includes:
a first feedback indication of whether the payload was received by a second wireless node, and
a second feedback indication of whether the first communication was received by the relay node;
wherein the first communication includes a shared channel that carries control information for forwarding the second communication; and
wherein the control information indicates a resource for the second communication or a configuration for the second communication.

13. The communication device of claim 12, further comprising:
the first interface or a second interface configured to obtain the first feedback indication of whether the payload was received by the second wireless node, wherein the first feedback indication includes a negative acknowledgment for the payload.

14. The communication device of claim 13, wherein the processing system is further configured to:
trigger retransmission of the second communication carrying the payload by the relay node.

15. The communication device of claim 12, further comprising a second interface configured to:
retransmit the first communication.

16. The communication device of claim 12, wherein the second communication is associated with a failure to decode feedback indicating whether the payload was received by the second wireless node, and wherein the communication device further comprises a second interface configured to:
retransmit the first communication.

17. The communication device of claim 12, wherein the second communication includes an explicit indication of whether the relay node successfully received the first communication, the second feedback indication comprising the explicit indication.

18. The communication device of claim 17, wherein the first feedback indication of whether the payload was received by the second wireless node and the explicit indication are multiplexed in an uplink channel.

19. The communication device of claim 12, wherein the first interface is further configured to:
obtain the first feedback indication of whether the payload was received by the second wireless node, wherein the first feedback indication includes a negative acknowledgment for the payload, and wherein the processing system is further configured to:
trigger a retransmission of the payload to the second wireless node.

20. A communication device of a control node for wireless communication, comprising:
a first interface configured to output a first configuration to a first wireless node, wherein the first configuration is associated with a first communication carrying a payload;
the first interface configured to output a second configuration to a relay node, wherein the second configuration is associated with at least one of transmitting a second communication carrying the payload of the first communication or processing feedback from a second wireless node;
the first interface or a second interface configured to obtain, from the relay node, a third communication that includes:
a first feedback indication of whether the second wireless node received the second communication, and
a second feedback indication of whether the relay node received the first communication,
wherein the first communication includes a shared channel that carries control information for forwarding the feedback; and
wherein the control information indicates a resource for the third communication or a configuration for the third communication.

21. The communication device of claim 20, wherein the second configuration indicates to provide the third communication.

22. The communication device of claim 21, wherein the second feedback indication is explicitly provided with the first feedback indication of whether the second wireless node received the second communication.

23. A method performed by a communication device of a relay node, comprising:
receiving, from a first wireless node and via a first wireless link, a first communication carrying a payload;
generating, using digital processing, a second communication, wherein the second communication is different than the first communication, and wherein the second communication carries the payload of the first communication;
transmitting, to a second wireless node and via a second wireless link, the second communication;
monitoring for an indication of whether the second wireless node received the second communication;
transmitting, to the first wireless node, a third communication that includes:
a first feedback indication of whether the second wireless node received the second communication, and
a second feedback indication that the relay node received the first communication;

wherein transmitting the third communication further comprises:
  forwarding the indication of whether the second wireless node received the second communication;
wherein the first communication includes a shared channel that carries control information for forwarding the indication; and
wherein the control information indicates a resource for the third communication or a configuration for the third communication.

24. The method of claim 23, wherein the shared channel includes the payload and a control channel carrying control information for the second communication.

25. The method of claim 23, wherein the third communication carries the first feedback indication of whether the second wireless node received the second communication and an explicit indication of whether the first wireless node successfully received the first communication, the second feedback indication comprising the explicit indication.

26. The method of claim 23, wherein transmission of the third communication indicates that the relay node successfully received the first communication.

\* \* \* \* \*